(12) United States Patent
Kanemura et al.

(10) Patent No.: US 7,503,049 B2
(45) Date of Patent: Mar. 10, 2009

(54) INFORMATION PROCESSING APPARATUS OPERABLE TO SWITCH OPERATING SYSTEMS

(75) Inventors: Kouichi Kanemura, Ibaraki (JP);
Teruto Hirota, Moriguchi (JP);
Takayuki Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 1157 days.

(21) Appl. No.: 10/853,132

(22) Filed: May 26, 2004

(65) Prior Publication Data

US 2005/0172294 A1    Aug. 4, 2005

(30) Foreign Application Priority Data

May 29, 2003    (JP)    ............................ 2003-153270

(51) Int. Cl.
| | |
|---|---|
| G06F 9/46 | (2006.01) |
| G06F 15/00 | (2006.01) |
| G06F 15/76 | (2006.01) |
| G06F 9/30 | (2006.01) |
| G06F 9/40 | (2006.01) |
| G06F 7/38 | (2006.01) |
| G06F 9/00 | (2006.01) |
| G06F 9/44 | (2006.01) |
| G06F 12/00 | (2006.01) |
| G06F 12/14 | (2006.01) |
| G06F 13/24 | (2006.01) |
| G06F 13/32 | (2006.01) |
| G06F 15/177 | (2006.01) |

(52) U.S. Cl. ........................ 718/108; 719/319; 719/321; 712/2; 712/205; 712/228; 712/233; 710/200; 710/260; 710/262; 710/269; 713/1; 713/2

(58) Field of Classification Search ................. 718/108; 719/319, 321; 712/2, 205, 228, 233; 710/200, 710/260, 262, 269; 713/1, 2
See application file for complete search history.

(56) References Cited

U.S. PATENT DOCUMENTS 4,493,034 A * 1/1985 Angelle et al. .............. 713/100

(Continued)

FOREIGN PATENT DOCUMENTS

JP    58-181149    10/1983

(Continued)

OTHER PUBLICATIONS

Richard York, "A New Foundation for CPU Systems Security", Security Extensions to the ARM Architecture, pp. 1-8, May 2003.

(Continued)

*Primary Examiner*—Meng-Ai An
*Assistant Examiner*—Eric C Wai
(74) *Attorney, Agent, or Firm*—Wenderoth, Lind & Ponack, L.L.P.

(57) ABSTRACT

An information processing apparatus switches between an Operating System 1 and an Operating System 2 during operation and comprises: a storing unit including a first area storing data managed by OS1, a second area storing a reset handler containing instructions for returning to OS2 and for branching to OS2, and a switching unit that switches connection/disconnection of the first area with outside; a table storing unit storing information showing the reset handler's position; a CPU having a program counter and executing an instruction at a position indicated by positional information in the program counter; and a management unit that, when instructed to switch from OS1 to OS2 while the apparatus is operating with OS1, instructs the switching unit to disconnect the first area and the CPU to reset. When instructed to reset itself, the CPU initializes its state and sets the reset handler positional information into the program counter.

19 Claims, 30 Drawing Sheets

U.S. PATENT DOCUMENTS

| | | | |
|---|---|---|---|
| 6,711,605 B2 * | 3/2004 | Sekiguchi et al. | 718/100 |
| 6,772,419 B1 | 8/2004 | Sekiguchi et al. | |
| 6,892,261 B2 * | 5/2005 | Ohno et al. | 710/260 |

FOREIGN PATENT DOCUMENTS

| | | |
|---|---|---|
| JP | 60-097440 | 5/1985 |
| JP | 62-133533 | 6/1987 |
| JP | 64-004838 | 1/1989 |
| JP | 01-118932 | 5/1989 |
| JP | 06-028497 | 2/1994 |
| JP | 06-266624 | 9/1994 |
| JP | 2001-216172 | 8/2001 |

OTHER PUBLICATIONS

Nikkei Byte, "NGSCB: Next Generation Secure Computing Base by Microsoft The Secure Scheme of Microsoft That Makes The Full Use of Encryption Technology", pp. 90-92, Jan. 2004, and the English translation.

York, Richard, "A New Foundation for CPU Systems Security, Security Extensions to the ARM Architecture," ARM Ltd., May 2003, pp. 1-8.

* cited by examiner

OPERATION OF CPU101

FIG.18
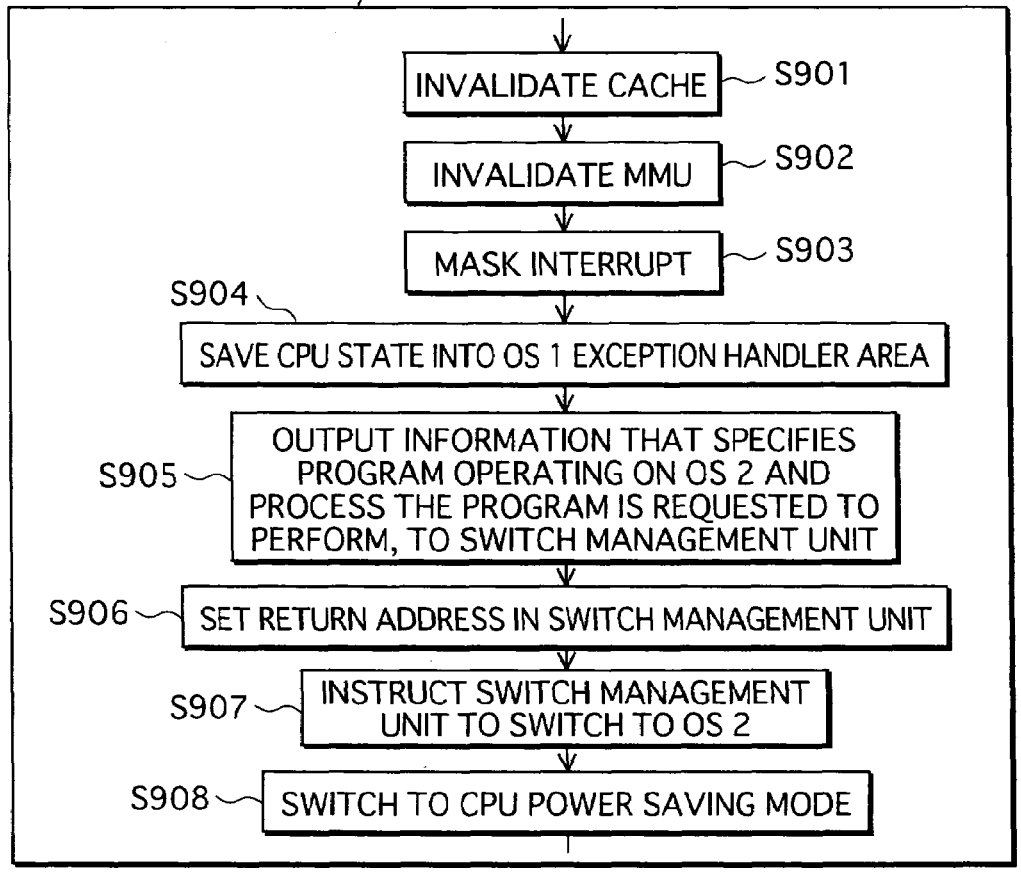
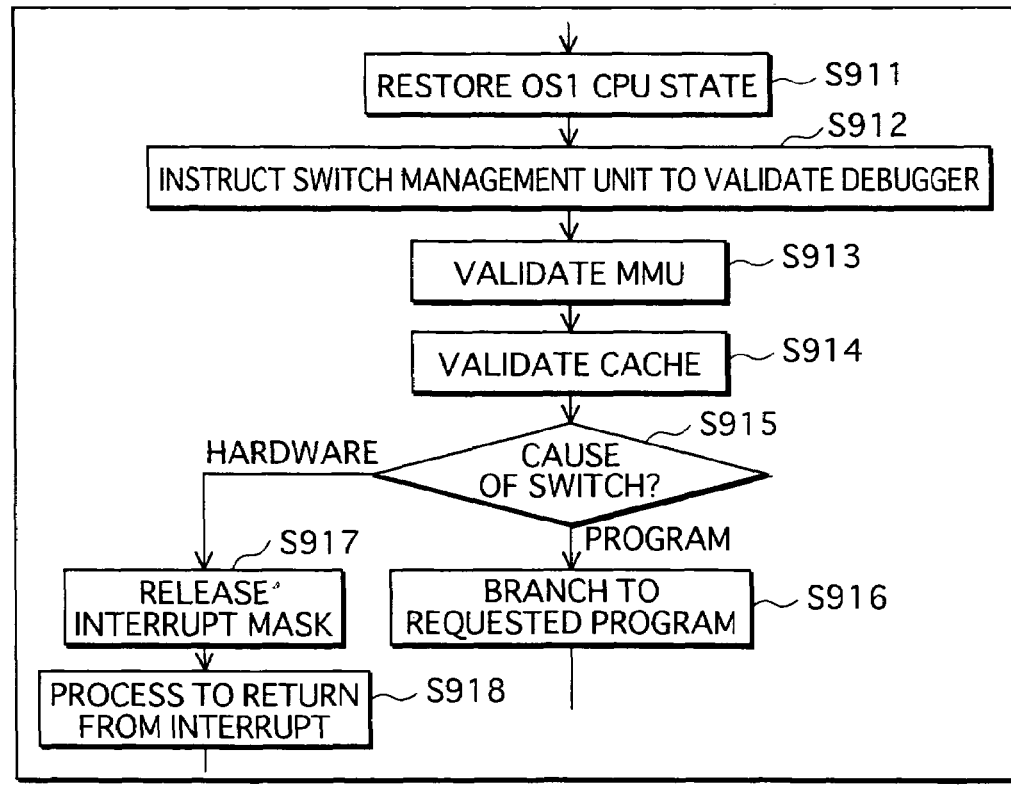

FIG.23A DEBUGGER IS VALID(OS 1 IN OPERATION)
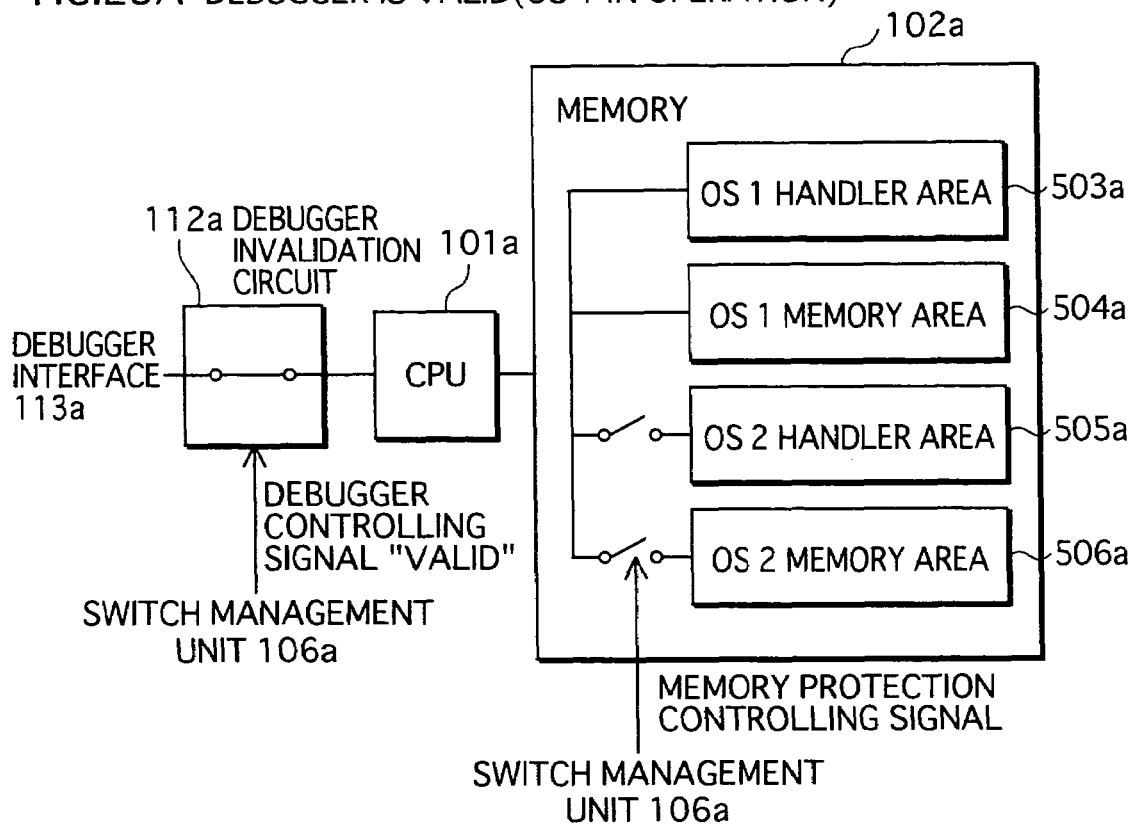
FIG.23B DEBUGGER IS INVALID(OS 2 IN OPERATION)
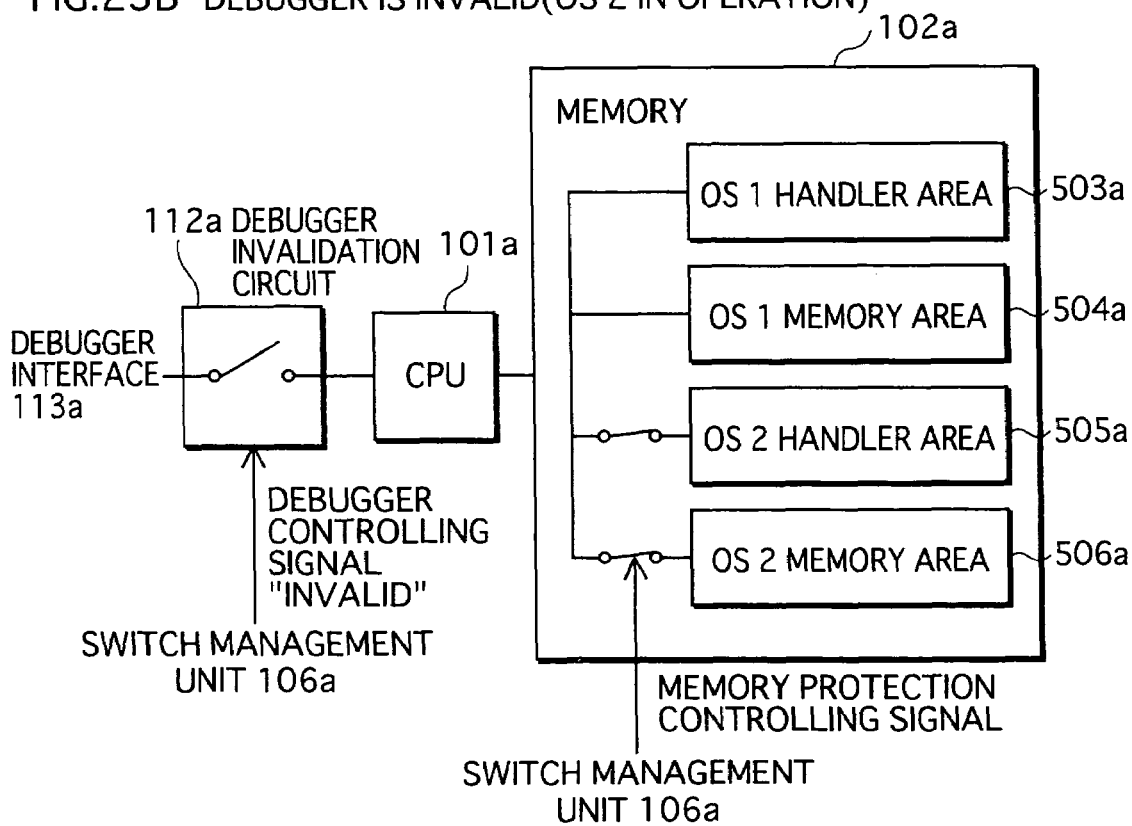

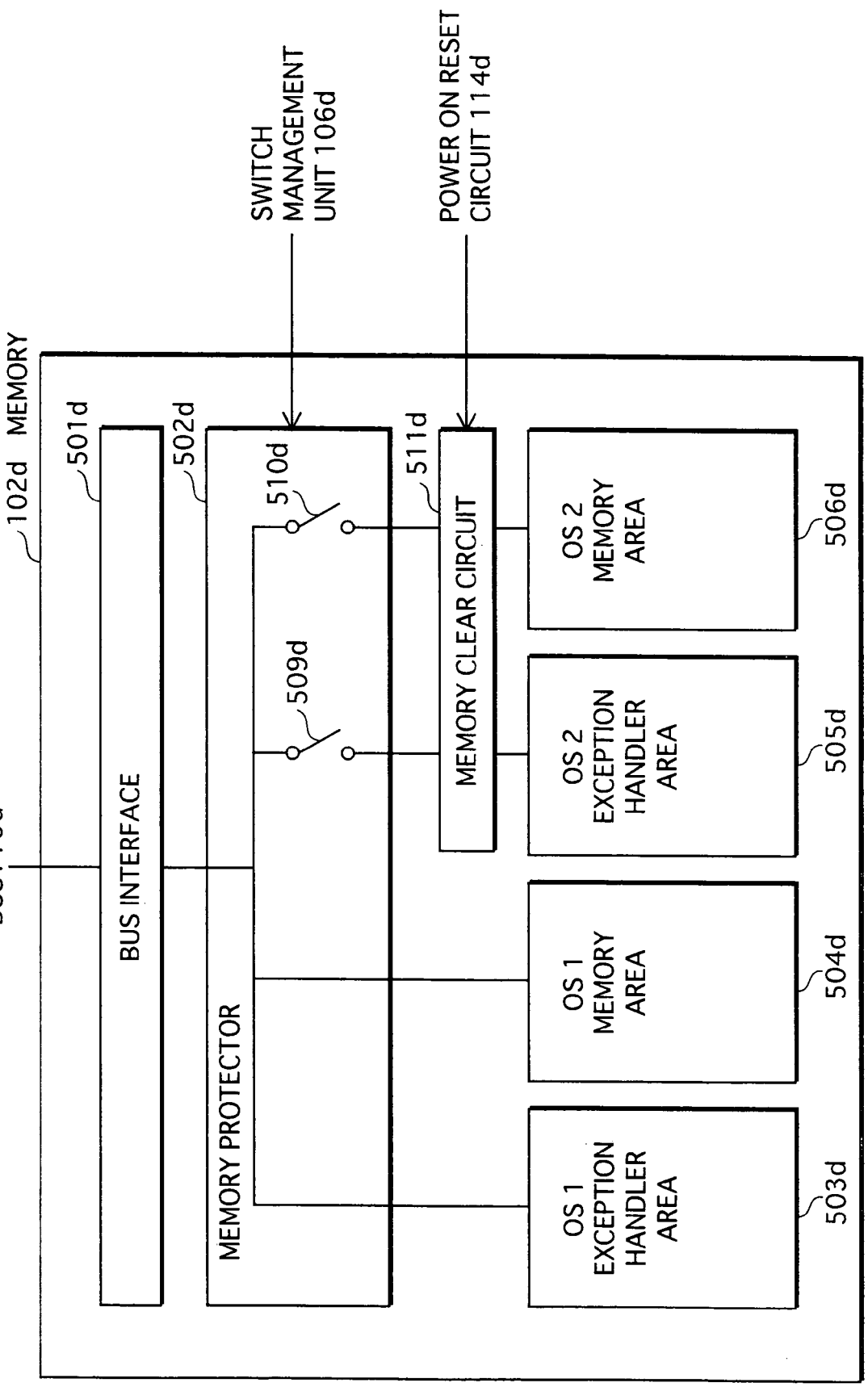

INFORMATION PROCESSING APPARATUS OPERABLE TO SWITCH OPERATING SYSTEMS

This application is based on an application No. 2003-153270 filed in Japan, the content of which is hereby incorporated by reference.

BACKGROUND OF THE INVENTION

1. Field of the Invention

The present invention relates to information processing apparatuses, particularly to a technique with which switching between operating systems occurs while processing is performed.

2. Description of the Related Art

A technique is disclosed with which switching between operating systems occurs while processing is performed, in the case where an apparatus has more than one operating system.

For example, Patent Document 1 discloses that, in an apparatus having more than one operating system, the kernel of each of the operating systems is resident in the primary storage, and it is therefore possible to speed up the process of switching between the operating systems. Further, since the state of the operating system when the switching is performed is stored into the secondary storage, it is possible to perform the process continuing from the state prior to the switching when the process returns to the previous operating system.

According to the technique disclosed in Patent Document 1, however, the information owned by each operating system is not necessarily protected from other operating systems. There is possibility that operation of an operating system may impede operation of another operating system or may destruct information owned by another operating system.

Patent Document 1: Japanese Unexamined Patent Application Publication No. 64-4838
Patent Document 2: Japanese Unexamined Patent Application Publication No. 2001-216172
Patent Document 3: Japanese Unexamined Patent Application Publication No. 60-97440
Patent Document 4: Japanese Unexamined Patent Application Publication No. 58-181149
Patent Document 5: Japanese Unexamined Patent Application Publication No. 62-133533
Patent Document 6: Japanese Unexamined Patent Application Publication No. 6-28497
Patent Document 7: Japanese Patent Publication No. 3018336
Patent Document 8: Japanese Patent Publication No. 2788590

SUMMARY OF THE INVENTION

In view of the problem stated above, an object of the present invention is to provide an information processing apparatus that has a plurality of operating systems and switches between operating systems while processing is performed, wherein it is possible to protect information owned by each operating system from other operating systems.

In order to achieve the object, the present invention provides an information processing apparatus that switches between a first operating system and a second operating system during operation, comprising: a storing unit including (i) a first area that stores therein data managed by the first operating system, (ii) a second area that stores therein a reset handler containing a return instruction for returning to the second operating system and a branch instruction for branching to the second operating system, and (iii) an access switching unit operable to switch between connection and disconnection of the first area with outside thereof; an exception table storing unit that stores therein a piece of positional information that shows a position at which the reset handler is located; a CPU that includes a program counter and is operable to execute an instruction located at a position indicated by positional information being set in the program counter; and a switch management unit operable to, when having received a switch instruction for switching from the first operating system to the second operating system while the information processing apparatus is operating with the first operating system in operation, instruct the access switching unit to make the first area disconnected and issue a reset instruction to the CPU to be reset, wherein when having received the reset instruction, the CPU initializes a state of the CPU and sets the piece of positional information of the reset handler into the program counter.

With this arrangement, when the first operating system is switched to the second operating system in the case where one of the operating systems is in operation during the operation of the information processing apparatus, the information processing apparatus makes the first area disconnected from the outside thereof; therefore, it is possible to protect the data managed by the first operating system. Also, since the CPU initializes the state thereof, the data stored inside the CPU while the information processing apparatus has been operating with the first operating system in operation is deleted; therefore, it is possible to protect the data stored inside the CPU while the first operating system is in operation from the second operating system. In addition, when the switch management unit has received a switch instruction, the CPU is reset; therefore, it is possible to make sure that the reset handler of the second operating system is executed after the switch instruction is received.

It is further acceptable to have an arrangement wherein the access switching unit is further operable to switch between connection and disconnection of the second area with outside thereof, and the switch management unit instructs, when having received the switch instruction, the access switching unit to make the second area connected, after making the first area disconnected.

With this arrangement, the second area is made connected after the first operating system is switched to the second operating system; therefore, it is possible to protect what is stored in the second area from the first operating system.

It is further acceptable to have an arrangement wherein the storing unit further includes a third area that stores therein a first interrupt handler containing a save instruction for saving a state of the CPU while the first operating system is in operation before the switch to the second operating system, the access switching unit is further operable to switch between connection and disconnection of the third area with outside thereof, the exception table storing unit further stores therein a piece of positional information that shows a position at which the first interrupt handler is located, the CPU sets, when the first interrupt handler has been called by a program being executed while the first operating system is in operation, the piece of positional information of the first interrupt handler into the program counter, and the switch management unit receives the switch instruction for switching from the first operating system to the second operating system from the first interrupt handler.

With this arrangement, when the operating system in operation is to be switched from the first operating system to the second operating system, the information processing apparatus saves the state of the CPU prior to the switching and has been operating with the first operating system in operation; therefore, when the operating system in operation is to be switched from the second operating system to the first operating system again, it is possible to restore the CPU to the previous state by reading the saved CPU state.

It is further acceptable to have an arrangement wherein the switch management unit receives information indicating a program specified out of programs operating on the second operating system and what process the specified program is requested to perform, and the switch management unit informs the reset handler of the specified program and the process indicated in the information.

With this arrangement, while the information processing apparatus is operating with the first operating system in operation, in the case where the first operating system is to be switched to the second operating system because of a process request to one of the programs managed by the second operating system, the information processing apparatus is able to notify the second operating system of the process request via the switch management unit.

It is further acceptable to have an arrangement wherein the third area further stores therein a second interrupt handler containing (i) a judge instruction for judging whether a hardware interrupt that has occurred is an interrupt from hardware managed by the first operating system or an interrupt from hardware managed by the second operating system and (ii) a branch instruction for, when the hardware interrupt is judged to be an interrupt from the hardware managed by the first operating system, branching to the first interrupt handler, the exception table storing unit stores therein a piece of positional information that shows a position at which the second interrupt handler is located, and when having received an interrupt while the first operating system is in operation, the CPU sets the piece of positional information of the second interrupt handler into the program counter.

With this arrangement, in the case where an interrupt from hardware managed by the second operating system occurs in the information processing apparatus, while the first operating system is in operation, the CPU executes the second interrupt handler so that the first interrupt handler is instructed to perform the switching to the second operating system; therefore, the information processing apparatus is able to process an interrupt from hardware managed by an operating system that is not currently being executed.

The present invention further provides the information processing apparatus operating with the second operating system in operation after processes of the second interrupt handler and the first interrupt handler have been performed, wherein the reset handler includes an instruction for preparing for returning from the second operating system to the first operating system, and the CPU sets, as part of the preparation for returning to the first operating system, a starting address of a program for returning to the first operating system into a link register inside the CPU and branches to a device driver that operates the hardware managed by the second operating system, and when having detected that a process of the device driver has been completed, sets the starting address having been set in the link register into the program counter.

With this arrangement, the information processing apparatus is able to return to the processing with the first operating system again when an interrupt process by the device driver is completed.

Also, when the operating system is switched back to the first operating system, it is possible to protect the data managed by the first operating system from the second operating system by performing a process that is similar to the one performed when the first operating system is switched to the second operating system.

It is acceptable to have an arrangement wherein the second interrupt handler further contains a branch instruction for branching to a device driver that operates the hardware managed by the first operating system, and when an interrupt has occurred, the CPU sets the piece of positional information of the second interrupt handler into the program counter, and when an interrupt has been judged to be an interrupt from the hardware managed by the first operating system, the CPU sets a piece of positional information of the device driver into the program counter.

With this arrangement, in the case where an interrupt from hardware managed by the first operating system occurs while the information processing apparatus is operating with the first operating system in operation, it is possible to process the hardware interrupt by having the CPU execute the second interrupt handler.

It is acceptable to have an arrangement wherein the storing unit further includes a fourth area that stores therein data managed by the second operating system, the access switching unit is further operable to switch connection and disconnection of the fourth area with outside thereof, and when being instructed by the reset handler to make the fourth area connected, the switch management unit instructs the access switching unit to make the fourth area connected.

With this arrangement, the information processing apparatus makes the fourth area connected during the process that is performed within the reset handler and is executed when the operation returns to the second operating system. Thus, since the fourth area is made connected after the operating system in operation is switched from the first operating system to the second operating system, it is possible to protect the data managed by the second operating system from the first operating system. In addition, it is also possible to make the fourth area connected after the reset handler judges whether the fourth area should be connected or not.

It is acceptable to have an arrangement wherein the information processing apparatus further includes an exception table switching unit operable to switch connection and disconnection of the exception table storing unit with outside thereof, wherein the exception table storing unit stores therein (i) a first exception table that includes pieces of positional information showing positions at which the first interrupt handler and the second interrupt handler are located and (ii) a second exception table that includes the piece of positional information showing the position at which the reset handler is located, while the CPU is operating with the first operating system in operation, the switch management unit issues an instruction for having the first exception table connected and while the CPU is operating with the second operating system in operation, the switch management unit issues an instruction for having the second exception table connected, and the exception table switching unit connects one of the first exception table and the second exception table to outside thereof, depending on the instruction issued by the switch management unit.

With this arrangement, while operating with the first operating system in operation, the information processing apparatus allows an external source to be connected to only the first exception table which is an exception table exclusively for the first operating system. While operating with the second operating system in operation, the information processing apparatus allows an external source to be connected only to the second exception table.

It is acceptable to have an arrangement wherein the access switching unit is operable to switch between connection and disconnection of the third area with outside thereof, and when having received, from the first interrupt handler, the switch instruction for switching from the first operating system to the second operating system, the switch management unit instructs the access switching unit to make the third area disconnected.

With this arrangement, it is possible to protect the first interrupt handler and the second interrupt handler from the second operating system, by making the third area disconnected. In addition, even after the third area is made disconnected, the second operating system is able to perform processing according to a process request that is made by the first operating system and received via the switch management unit.

It is acceptable to have an arrangement wherein after having executed the save instruction, the first interrupt handler instructs the CPU to switch to a power saving mode, the CPU performs a process of switching to the power saving mode and outputs, to the switch management unit, a signal indicating that the CPU is in the power saving mode, and the switch management unit gives the reset instruction to the CPU to be reset, after having received the signal.

With this arrangement, since the CPU receives an instruction for a reset after the mode has been switched to the power saving mode, even if the CPU receives a second interrupt, the CPU is able to initialize the state thereof after the process currently being executed is completed. When a reset is instructed while the CPU is interacting with an external device, there is a possibility that the interaction with the external device cannot be completed, and the external device may hang up. This arrangement solves such a problem.

In order to achieve the aforementioned object, the present invention further provides an information processing apparatus that switches between a first operating system and a second operating system during operation, comprising: a storing unit including (i) a first area that stores therein data managed by the first operating system, (ii) a second area that stores therein a first interrupt handler containing a save instruction related to switching from the first operating system to the second operating system and an instruction that branches to another instruction for branching to the second operating system, (iii) a third area that stores therein a second handler containing a save instruction for saving the second operating system and a return instruction for returning to the second operating system, and (iv) an access switching unit operable to switch connection and disconnection of the first area and the second area with outside thereof; and a switch management unit that includes a branch instruction storing unit storing therein a branch instruction for branching to the first interrupt handler and a fetch detecting unit operable to detect that the branch instruction has been fetched, wherein when the fetch detecting unit has detected that the branch instruction has been fetched, the switching management unit instructs the access switching unit to make the first area disconnected.

With this arrangement, the information processing apparatus instructs that the first area should be disconnected as a result of fetching of the branch code stored in the switch management unit; therefore, the information processing apparatus is able to perform both the branching to the second operating system and making the first area disconnected at the same time. Thus, it is possible to protect the data managed by the first operating system from the second operating system.

Further, it is acceptable to have an arrangement wherein the information processing apparatus further comprises a CPU that includes a program counter and is operable to execute an instruction located at a position indicated by positional information being set in the program counter, wherein the CPU sets, before processing the second interrupt handler and issues an instruction for switching from the second operating system to the first operating system, a return address for returning from the first operating system to the second operating system, into the branch instruction storing unit.

With this arrangement, the information processing apparatus sets the return address for the second operating system into the branch instruction storing unit before the operating system is switched to the first operating system; therefore, the second operating system is able to set the instruction address to be executed by the CPU after the first operating system is switched to the second operating system.

It is further acceptable to have an arrangement wherein the first interrupt handler masks an interrupt and informs the switch management unit of a program specified out of programs operating on the second operating system and what process the specified program is requested to perform, the CPU reads a piece of positional information that shows a position at which the return instruction called by the first interrupt handler is located, from the branch instruction storing unit and sets the piece of positional information of the return instruction into the program counter, and the switching management unit informs the second interrupt handler of the specified program and the process.

It is also acceptable to have an arrangement wherein the second interrupt handler checks for a cause of the switch from the first operating system to the second operating system, and when the cause of the switch is a process request to a program operating on the second operating system, the second interrupt handler branches to the specified program, and the CPU sets a piece of positional information that shows a position at which the specified program called by the second interrupt handler is located, into the program counter.

With these arrangements, in the case where the first operating system is switched to the second operating system due to a process request to one of the programs managed by the second operating system while the information processing apparatus is operating with the first operating system in operation, the information processing apparatus is able to notify the process request to the second operating system via the switch management unit so that the second operating system is able to execute the requested process.

It is also acceptable to have an arrangement wherein the second interrupt handler checks for a cause of the switch from the first operating system to the second operating system, and when the cause of the switch is an interrupt from hardware managed by the second operating system, the second interrupt handler releases the interrupt mask and sets a piece of positional information that shows a position at which a device driver operating the hardware managed by the second operating system is located, into the program counter, and when having detected that a process performed by the device driver is completed, the CPU sets the piece of positional information of the return instruction into the program counter.

With this arrangement, even if an interrupt from the second operating system is an interrupt from hardware managed by the second operating system, the information processing apparatus is able to process the hardware interrupt by having the CPU execute the second handler. In addition, when the interrupt process performed by the device driver is completed, the procedure advances to the save instruction of the second operating system; therefore, the information processing apparatus is able to return to the process with the first operating system again.

It is also acceptable to have an arrangement wherein the information processing apparatus further comprises a debugger invalidation circuit operable to connect and disconnect the CPU to and from an external debugger, in response to an instruction from the switch management unit, wherein while the CPU is operating with the first operating system in operation, the switch management unit instructs the debugger invalidation circuit to disconnect the CPU from the external debugger, and while the CPU is operating with the second operating system in operation, the switch management unit instructs the debugger invalidation circuit to connect the CPU to the external debugger.

With this arrangement, while the CPU is operating with the first operating system in operation, the information processing apparatus is able to protect the data managed by the first operating system from debuggers by invalidating the debuggers.

It is also acceptable to have an arrangement wherein the information processing apparatus further comprises a vector interrupt controller that includes (i) a first signal line via which an interrupt from hardware managed by the first operating system is received, (ii) a second signal line via which an interrupt from hardware managed by the second operating system is received, and (iii) a table showing pieces of positional information of a device driver operating the hardware managed by the first operating system and of a device driver operating the hardware managed by the second operating system, wherein the second area further stores therein a boot code for booting the first operating system, while the boot code is being executed, the CPU invalidates obtainment of the pieces of positional information of the device drivers from the vector interrupt controller, and while the second interrupt handler is being executed, the CPU validates obtainment of the pieces of positional information of the device drivers from the vector interrupt controller.

With this arrangement, in the case where the information processing apparatus has a vector interrupt controller, when the vector interrupt controller has received a hardware interrupt, the processing directly branches to the processing performed by a device driver according to a table without going through the processing by the interrupt handler. In such a case, the switch management unit is not able to instruct the access switching unit to make the first area and the second area disconnected; therefore, while operating with the first operating system in operation, the information processing apparatus invalidates obtainment of positional information of the device driver from the vector interrupt controller. Thus, it is possible to prevent the switching to the second operating system from occurring while the first area and the second area are connected and to protect information managed by the first operating system from the second operating system.

It is also acceptable to have an arrangement wherein the information processing apparatus further comprises a power-on reset circuit, wherein the storing unit further includes a stored-data deleting unit, the power-on reset circuit outputs a reset signal for initializing the CPU and the storing unit to the CPU and the stored-data deleting unit, the CPU initializes a state of the CPU, when having received the reset signal from the power-on reset circuit, and the stored-information deleting unit deletes data stored in the storing unit, when having received the reset signal from the power-on reset circuit, and make the storing unit disconnected from outside thereof during a time period between the reception of the reset signal and completion of the deletion of the stored data.

With this arrangement, when the information processing apparatus has been initialized due to a power-on reset, the inside of the CPU and the inside of the storage area are cleared; however, there is a difference between the time required for clearing the inside of the CPU and the time required for clearing the inside of the storing unit. Even if the inside of the CPU has been cleared, and the second operating system has been booted, in the case where the inside of the storing unit is not completely cleared, and some of the data managed by the first operating system remains, it is not possible to protect the data managed by the first operating system from the second operating system; therefore, when a power-on reset is instructed, reading from the CPU is blocked until the inside of the storing unit is cleared. This way, it is possible to protect the data managed by the first operating system from the second operating system.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 17 shows the configuration of the memory 102a;

FIG. 18 shows the operation of the CPU 101a performed when the OS 1 software interrupt handlers, 801 and 802 are executed;

FIG. 21 shows the configuration of the switch management unit 106a;

FIG. 23 is a drawing for illustrating the debugger invalidation circuit 112a; FIG. 23A shows a state in which the debugger invalidation circuit 112a is "valid"; FIG. 23B shows a state in which the debugger invalidation circuit 112a is "invalid";

FIG. 30 shows the configuration of the memory 102d.

DESCRIPTION OF THE PREFERRED EMBODIMENTS

First Embodiment

The following describes the information processing apparatus 100 as the first embodiment of the present invention, with reference to the drawings. In this description of the invention and the drawings, an "operating system" is sometimes simply referred to as an "OS".

Configuration

Figure 1:
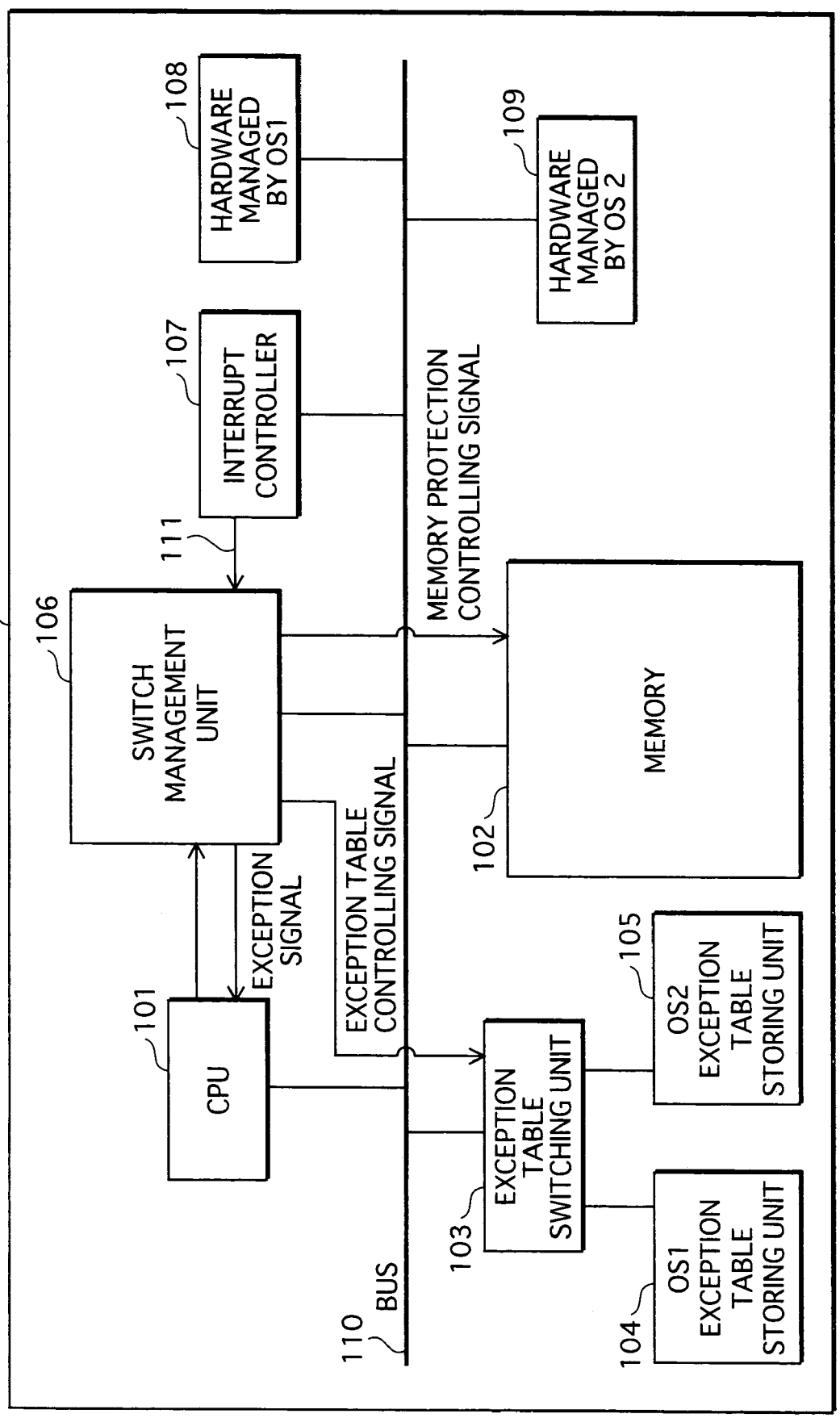
FIG. 1 is a functional block diagram that shows the configuration of the information processing apparatus 100 in terms of its functions.

FIG. 1 is a functional block diagram that shows the configuration of the information processing apparatus 100 in terms of its functions.

As shown in the drawing, the information processing apparatus 100 comprises: a CPU (Central Processing Unit) 101; a memory 102; an exception table switching unit 103, an OS 1 exception table storing unit 104; an OS 2 exception table storing unit 105; a switch management unit 106, an interrupt controller 107, hardware managed by the OS 1 108, hardware managed by the OS 2 109, and a bus 110.

Figure 2:
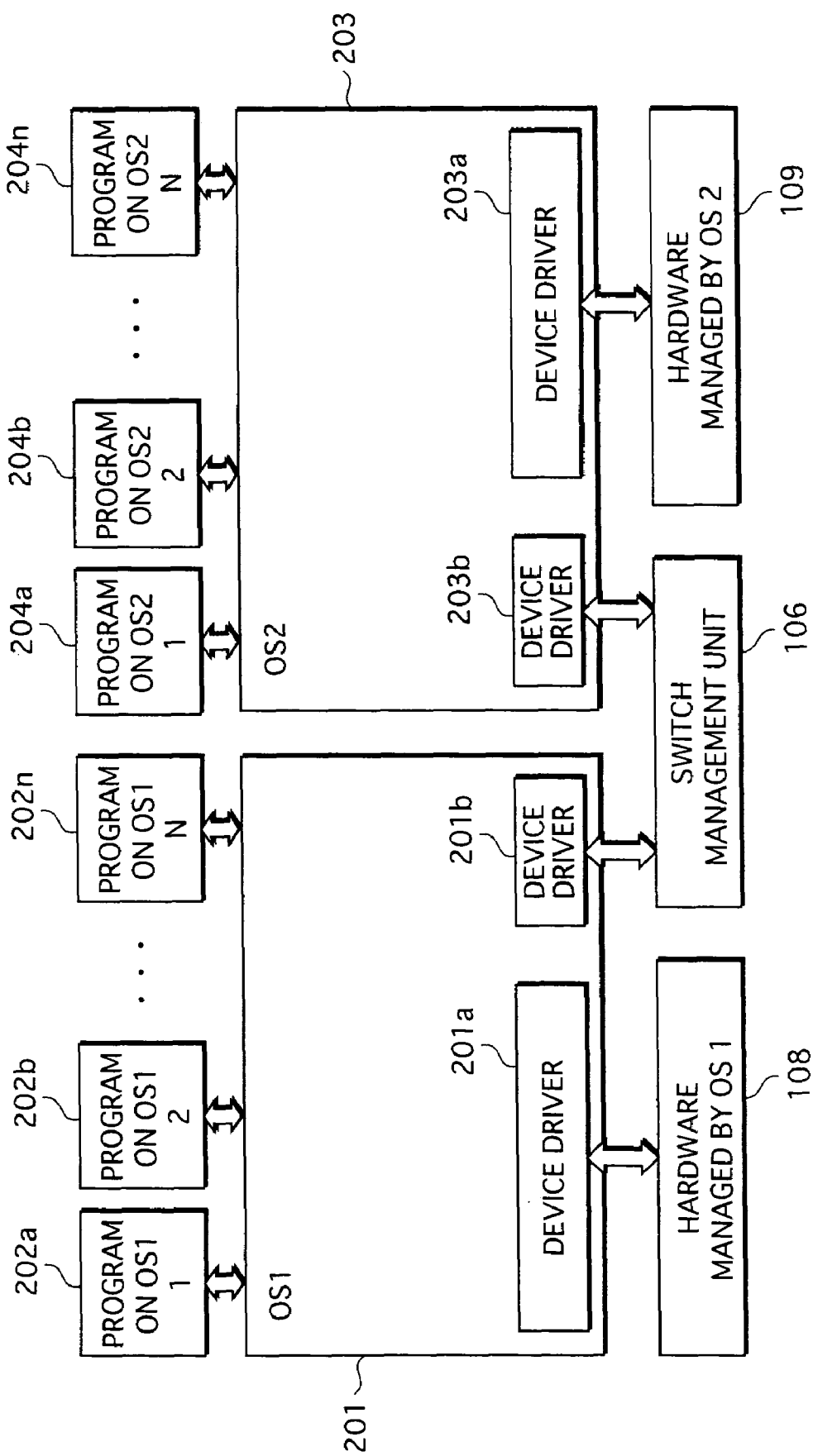
FIG. 2 shows the software configuration of the information processing apparatus 100.

FIG. 2 shows the software configuration of the information processing apparatus 100.

As shown in the drawing, the software in the information processing apparatus 100 includes: the OS 1 (201); a program 1 (202a), a program 2 (202b), . . . , and a program N (202n) that each operate on the OS 1; as well as the OS 2 (203); a program 1 (204a), a program 2 (204b), . . . , and a program N (204n) that each operate on the OS 2. The OS 1 includes a device driver 201a for controlling the hardware managed by the OS 1 108 and a device driver 201b for controlling the switch management unit 106. The OS 2 includes a device driver 202a for controlling the hardware managed by the OS 2 109 and a device driver 202b for controlling the switch management unit 106.

The information processing apparatus 100 continuously performs processing by switching between the operating systems from the OS 1 to the OS 2 or from the OS 2 to the OS 1, depending on which operating system, out of the OS 1 and the OS 2, manages the processing. The following describes the constituent elements of the information processing apparatus 100.

(1) The CPU 101

Figure 3:
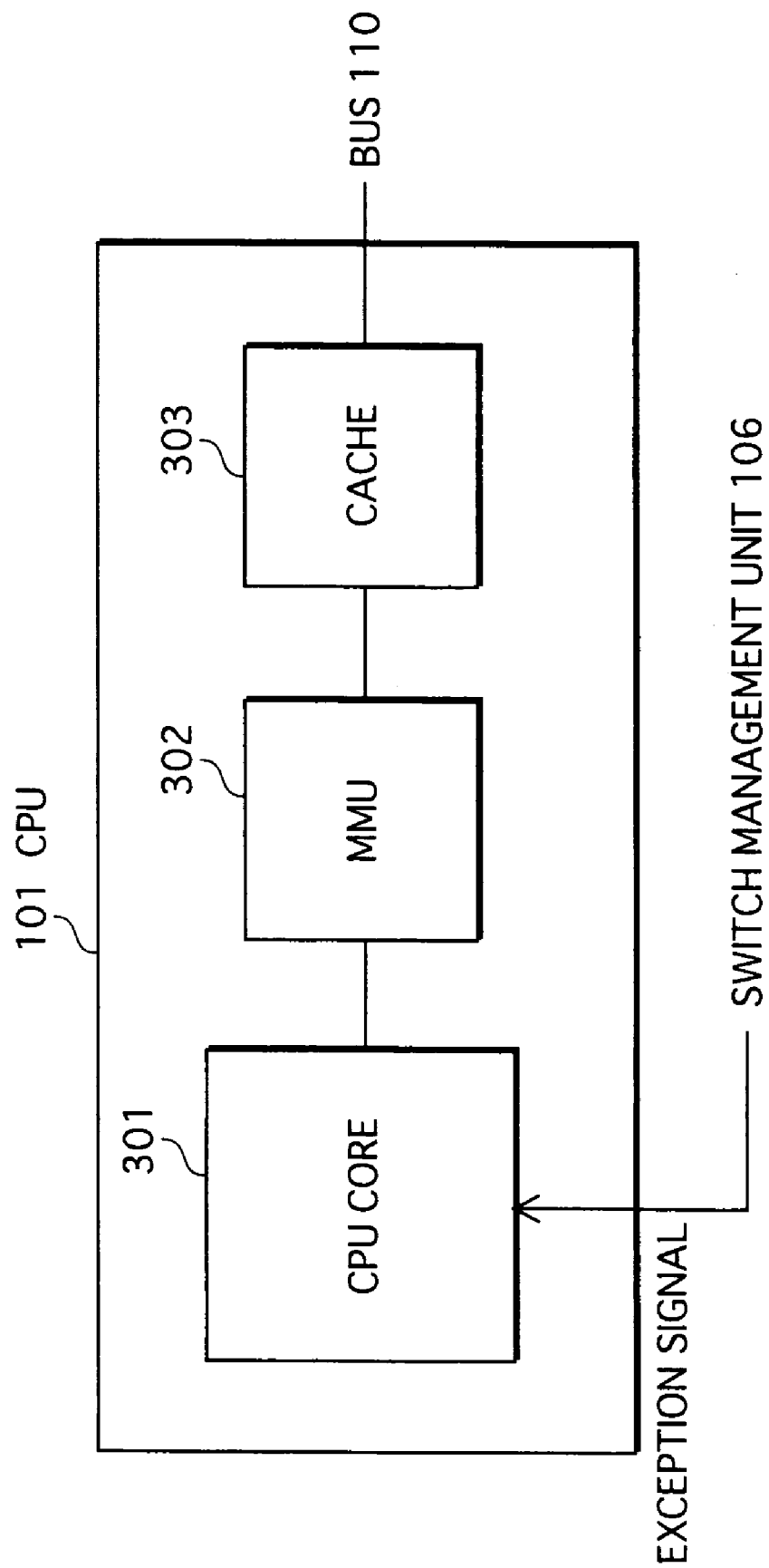
FIG. 3 shows the configuration of the CPU 101.

FIG. 3 shows the configuration of the CPU 101. As shown in the drawing, the CPU 101 is made up of a CPU core 301, an MMU (Memory Management Unit) 302, and a cache 303.

The CPU core 301 includes an instruction fetching unit, an instruction decoder, an operator, register files, and the like. The instruction fetching unit reads an instruction from the cache 303. The instruction decoder analyzes the read instruction, and notifies the operator of the information. Further, the instruction decoder transfers data from the register to the operator. The operator implements operation on the data and writes the result back into the register.

The CPU core 301 receives an exception signal, such as an interrupt signal or a reset signal, from the switch management unit 106. A reset signal is a signal that instructs the CPU 101 to clear the inside of the CPU and branch to a reset handler.

The MMU 302 realizes a virtual storage function by converting a logical address into a physical address. A logical address is in correspondence with a physical address according to a page table stored in the memory 102. The MMU 302 converts addresses by referring to the page table.

The cache 303 is a memory that has a higher speed and a smaller capacity than the memory 102. The cache 303 stores therein an instruction that the CPU core 301 has read from the memory 102.

In the present embodiment, it is assumed that the cache 303 is a physical address cache; however, in the present invention, the cache is not limited to a physical address cache. It is acceptable that the cache is a virtual address cache.

Here, the CPU 101 is either in the user mode or one of the exception modes. When the CPU 101 is in the user mode, it means that the CPU 101 is performing a normal process. When the CPU 101 is in one of the exception modes, it means that the CPU 101 is performing an exceptional process. The exception modes include a plurality of different modes each of which corresponds to a different one of causes of exceptions.

Figure 4:
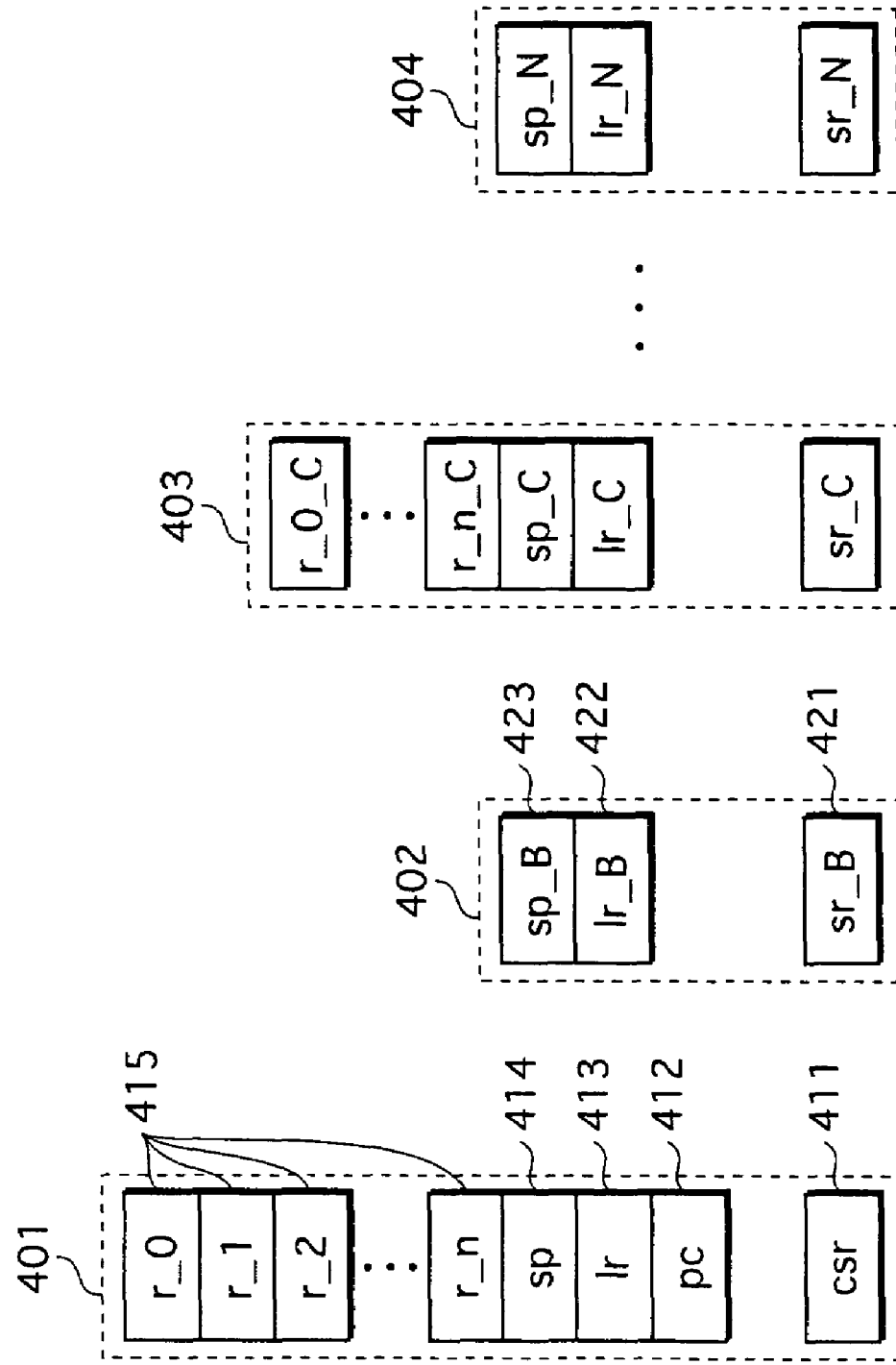
FIG. 4 shows the configuration of the register file 400 included in the CPU 101.

FIG. 4 shows the configuration of the register file 400 included in the CPU core 301. The register file 400 includes a plurality of register sets. Each of the register sets corresponds to a different one of the modes of the CPU 101.

The register set 401 corresponds to the user mode and is made up of a current status register (csr) 411, a program counter (pc) 412, a link register (lr) 413, a stack pointer (sp) 414, and general registers (r_0 to r_n) 415.

The register set 402, the register set 403, . . . and the register set 404 each correspond to a different one of the exception modes. The register set 402 is made up of a status register (sr_B) 421, a link register (lr_B) 422, and a stack pointer (sp_B) 423. The register sets 403 through 404 are each made up of a status register, a link register, and a stack pointer. Additionally, some of the register sets, e. g. the register set 403, each include general registers (r_0_c to r_n_c).

The current status register (csr) 411 in the register set 401 includes a mode bit that indicates a mode in which the CPU 101 is set. This mode bit is accessible only when the CPU 101 is in one of the exception modes.

When being in the user mode, the CPU 101 is able to access registers other than the mode bit of the current status register 411 in the register set 401. When being in one of the exception modes, the CPU 101 is able to access any register set.

Figure 5:
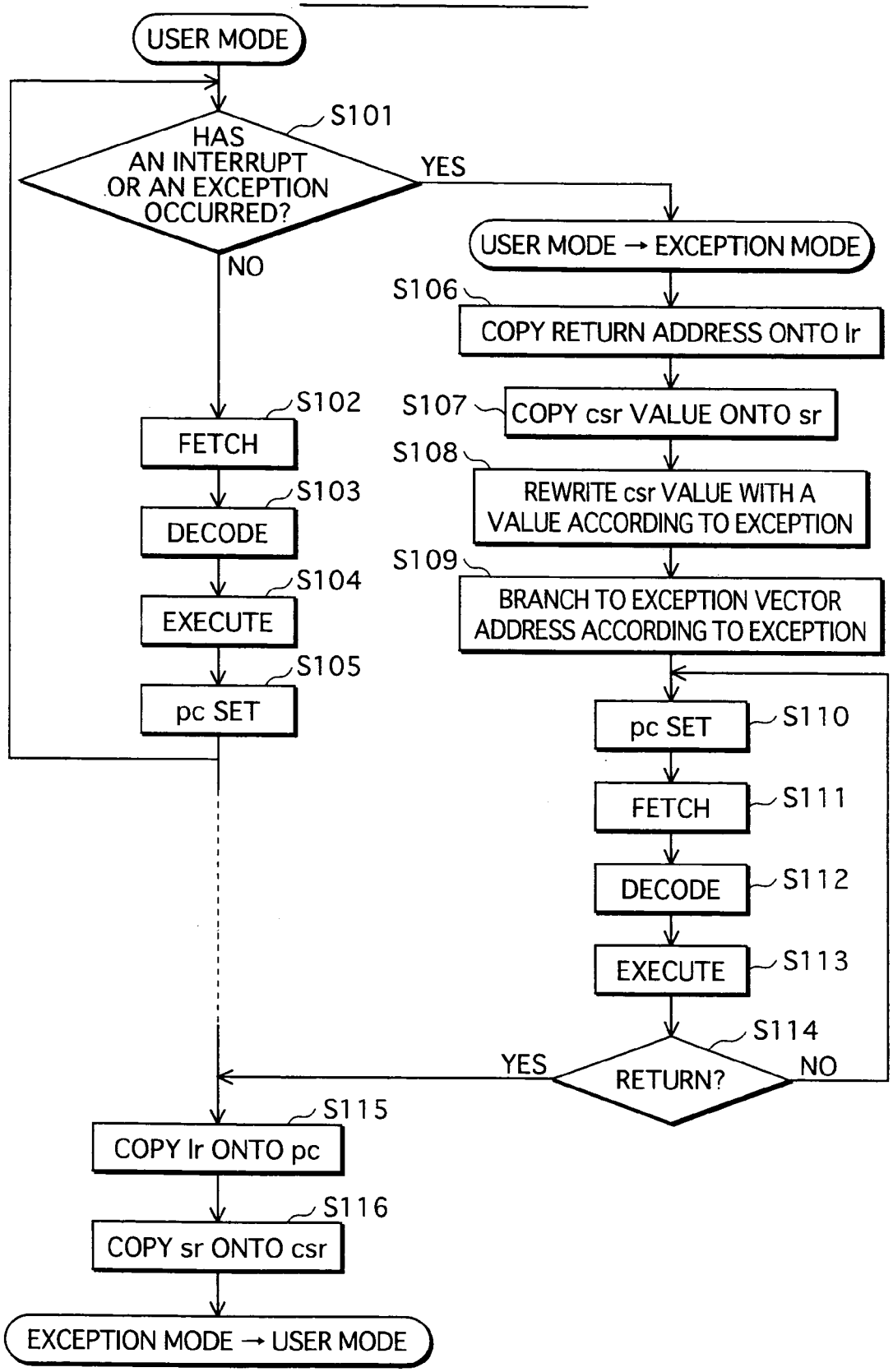
FIG. 5 shows the operation of the CPU 101.

The following describes the operation of the CPU 101 with reference to FIG. 5.

When the CPU 101 is in the user mode, if no interrupt or no exception occurs (Step S101: No), the CPU 101 fetches an instruction (Step S102), decodes the instruction (Step S103), executes the instruction (Step S104), and advances the address in the program counter (pc) 412 (Step S105). Then, the procedure returns to Step S101, and the process continues.

When the CPU 101 is in the user mode, if an interrupt or an exception occurs (Step S101: Yes; here, as an example, it is assumed that an exception corresponding to the register set 402 has occurred), the CPU 101 copies a return address, i.e. the address of an instruction subsequent to the instruction being executed when the exception occurred onto the link register (lr_B) 422 of the register set 402 (Step S106).

Next, the CPU 101 copies the value in the current status register (csr) 411 onto the status register (sr_B) 421 (Step S107). The CPU 101 rewrites the mode bit in the current status register (csr) 411 with a bit that indicates the type of exception (Step S108). The CPU 101 then branches to a vector address corresponding to the type of exception (Step S109), and sets the program counter (pc) 412 at an address that indicates an exception handler (Step S110).

Subsequently, the CPU 101 performs an exception process using the general register 415, the stack pointer (sp_B) 423, the link register (lr) 422, the program counter (pc) 412, and the current status register (csr) 411. More specifically, the CPU 101 fetches an instruction (Step S111), decodes the instruction (Step S112) and executes the instruction (Step 113). The CPU 101 repeats the steps from Step S110 to Step S114 until an instruction to instruct that the mode should be switched from the one of the exception modes back to the user mode is issued (Step 114: No).

When an instruction to instruct that the mode should be switched from the one of the exception modes back to the user mode is issued (Step S114: Yes), the CPU 101 copies the link register (lr_B) 422 of the register set 402 onto the program counter (pc) 412 of the register set 401 (Step S115). Further, the CPU 101 copies the value of the status register (sr_B) 421 onto the current status register (csr) 411 (Step S116).

The mode bit in the current status register (csr) 411 is changed from the one indicating one of the exception modes to the one indicating the user mode. The CPU returns to Step S101 and performs the process in the user mode.

It should be noted that the CPU 101 operates in the similar manner in the case where an exception has occurred in which another register set such as the register set 403 or the register set 404 is used.

(2) The Memory 102

Figure 6:
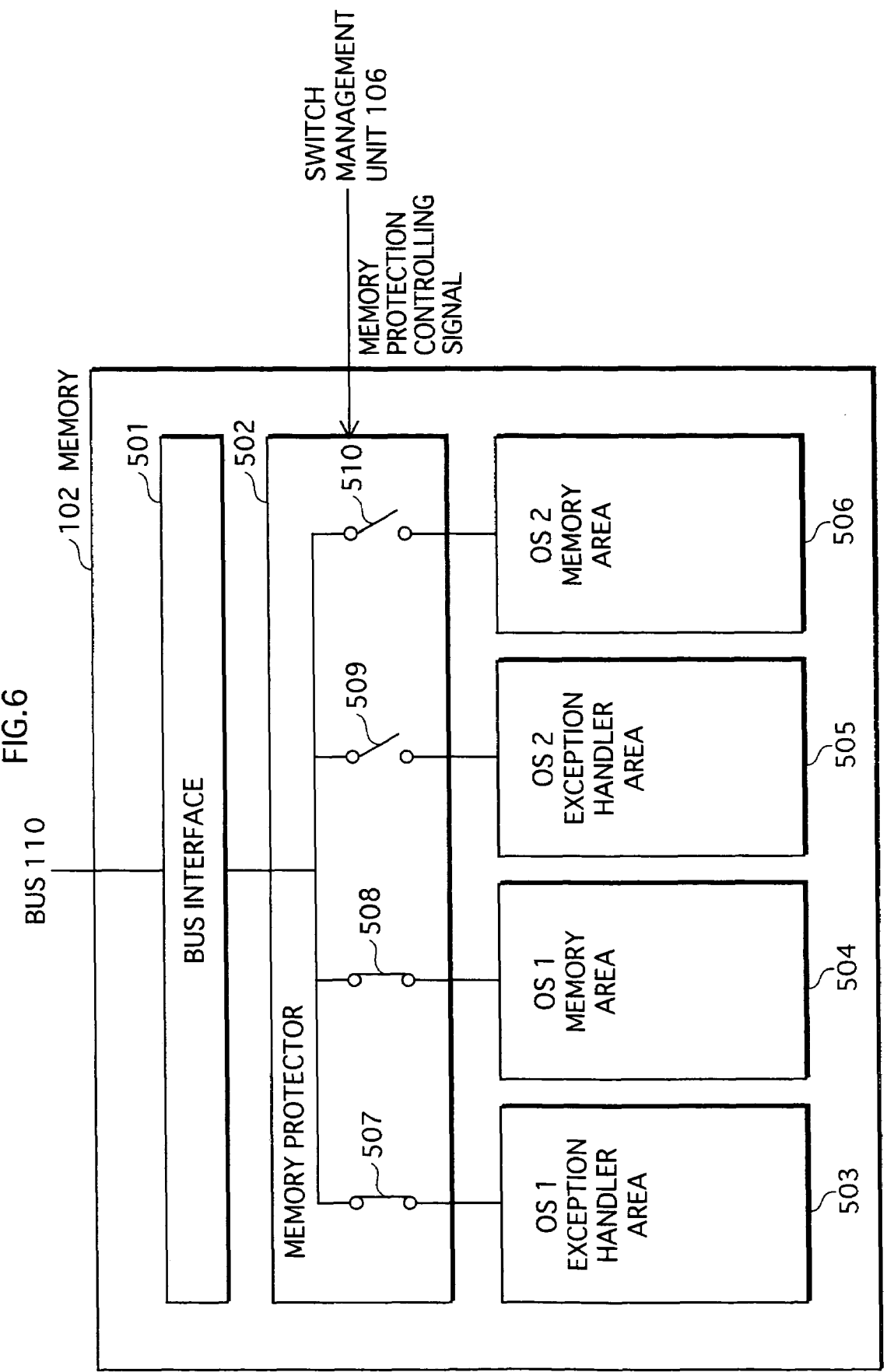
FIG. 6 shows the configuration of the memory 102.

FIG. 6 shows the configuration of the memory 102, which is the primary storage. The memory 102 includes a bus interface 501, a memory protector 502, and a memory area. As shown in the drawing, the memory area is divided into the OS 1 exception handler area 503, the OS 1 memory area 504, the OS 2 exception handler area 505, and the OS 2 memory area 506.

The memory protector 502 includes: the switch 507 provided between the bus interface 501 and the OS 1 exception handler area 503; the switch 508 provided between the bus interface 501 and the OS 1 memory area 504; the switch 509 provided between the bus interface 501 and the OS 2 exception handler area 505; and the switch 510 provided between the bus interface 501 and the OS 2 memory area 506.

The memory protector 502 receives a memory protection controlling signal issued by the switch management unit 106 and opens or closes each switch according to the received memory protection controlling signal, so that each of the memory areas connected with the switches becomes inaccessible or accessible. In FIG. 6, the switch 507 and the switch 508 are closed and the switch 509 and the switch 510 are open; therefore, the OS 1 exception handler area 503 and the OS 1 memory area 504 are accessible, while the OS 2 exception handler 505 and the OS 2 memory area 506 are inaccessible. To each of the accessible memory areas, the access via the bus 110 is allowed. To each of the inaccessible memory areas, the access via the bus 110 is prohibited, and therefore the data stored inside the inaccessible memory areas is protected.

(a) The OS 1 Exception Handler Area 503

Figure 7:
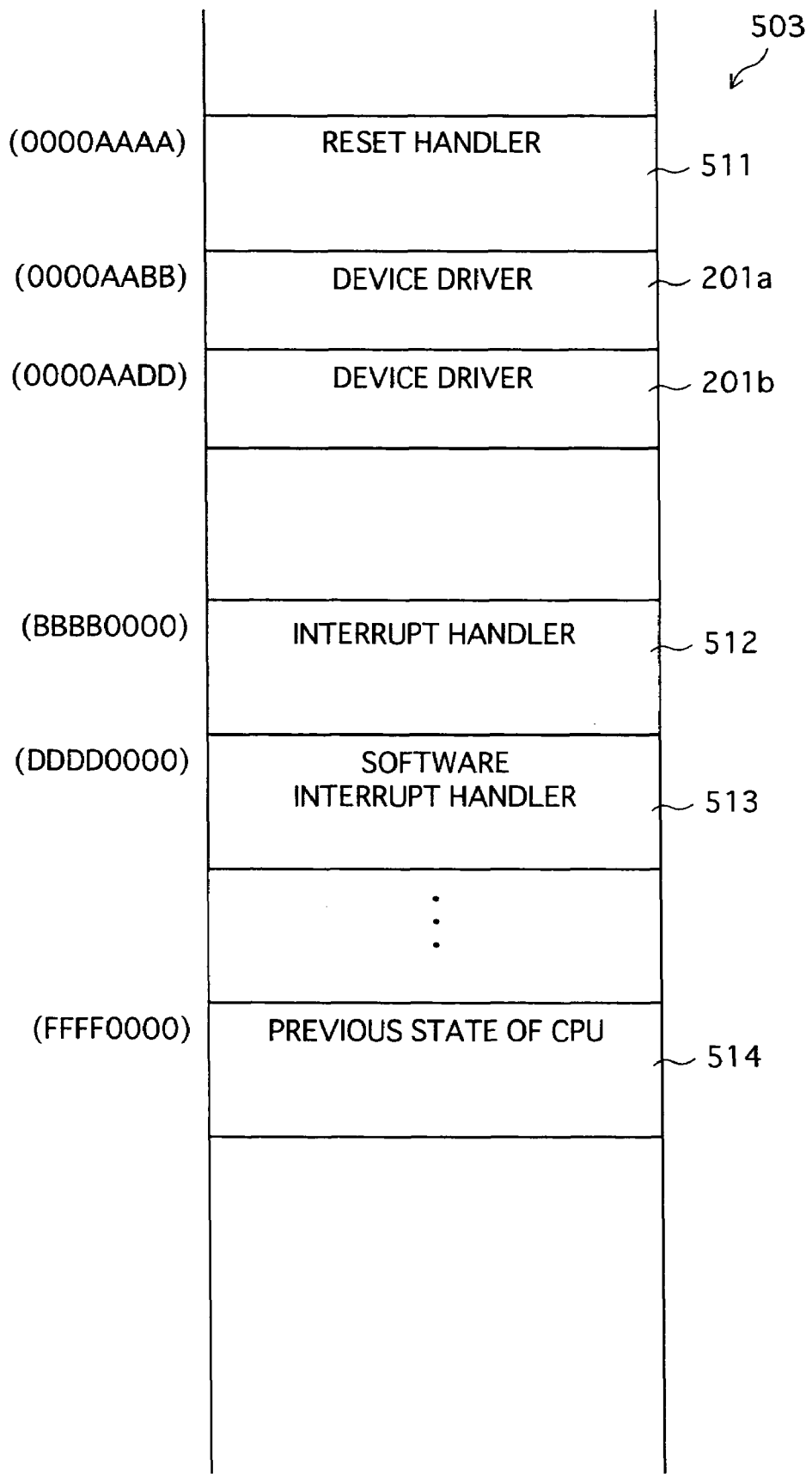
FIG. 7 shows an example of a memory map in the OS 1 exception handler area 503.

FIG. 7 shows the OS 1 exception handler area 503.

The OS 1 exception handler area 503 stores therein a reset handler 511, a device driver 201a, a device driver 201b, an interrupt handler 512, a software interrupt handler 513, and a previous state of the CPU 514. The character sequences "0000AAAA" and "0000AABB" on the left side are addresses at each of which a program is located.

The Reset Handler 511

Figure 8:
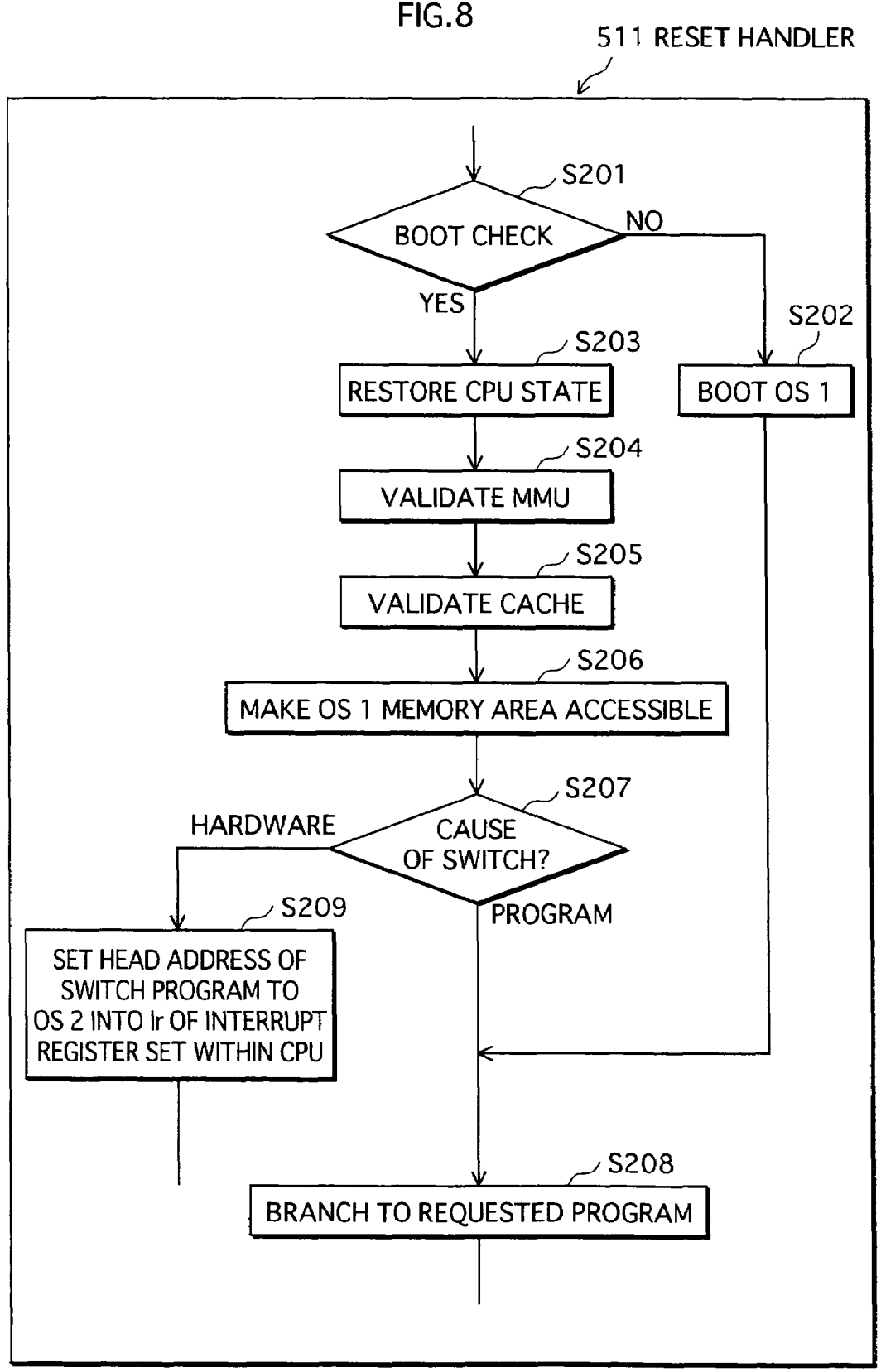
FIG. 8 shows the operation of the CPU 101 performed when the reset handler 511 is executed.

The reset handler 511 stored in the OS 1 exception handler area 503 is actually a computer program; however, for convenience of description, explanation is provided on the operation of the CPU 101 performed when the reset handler 511 is executed, with reference to the flow chart in FIG. 8.

The CPU 101 performs a boot check so as to judge whether or not the OS 1 is booted (Step S201). When the OS 1 is not booted (Step S201: No), the CPU 101 boots the OS 1 (Step S202), and the procedure advances to Step S208.

When the OS 1 is booted (Step S201: Yes), the CPU 101 reads the previous state of the CPU 514 from the OS 1 exception handler area 503 in the memory 102, and restores the CPU 101 to the previous state (Step S203). It should be noted that the CPU state includes the setting of the MMU 302. The CPU 101 validates the MMU 302 (Step S204) and validates the cache 303 (Step S205). The CPU 101 then instructs the switch management unit 106 to make the OS 1 memory area 504 accessible (Step S206) and further inquires of the switch management unit 106 about the cause of the switch.

When the cause of the switch is a process request to one of the programs operating on the OS 1 (one of the programs 202a through 202n shown in FIG. 2) (Step S207: PROGRAM), the CPU 101 branches to the requested program (Step S208).

When the cause of the switch is an interrupt from the hardware managed by the OS 1 108 (Step S207: HARDWARE), the CPU 101 sets, as preparation for returning to the OS 2, the head address of the program for switching from the OS 1 to the OS 2 into the link register of the register set within the register file 400 that corresponds to the interrupt (S209). Subsequently, the CPU 101 branches to the interrupt handler 512.

The Interrupt Handler 512

Figure 9:
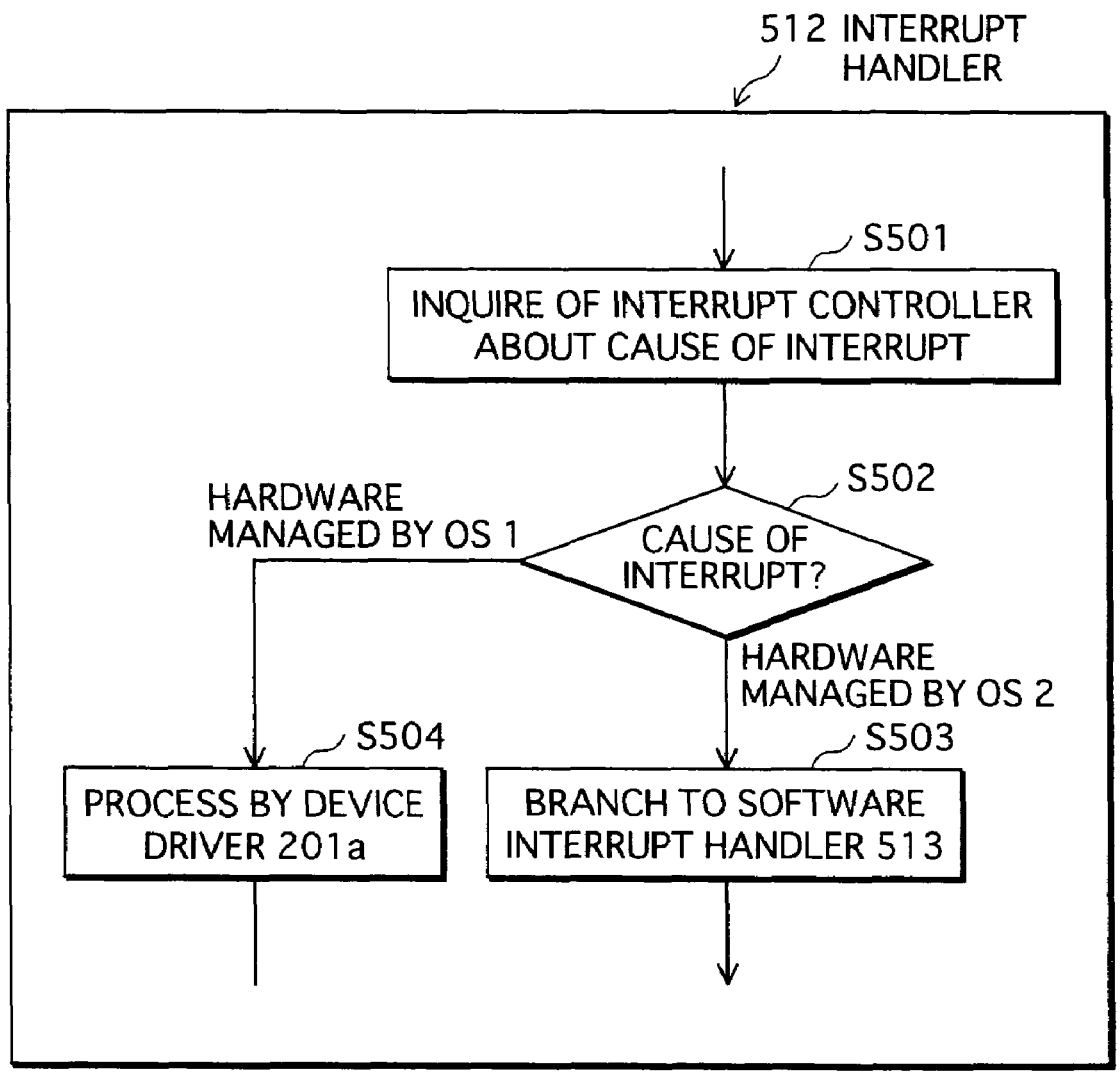
FIG. 9 shows the operation of the CPU 101 performed when the interrupt handler 512 is executed.

As for the interrupt handler 512, the following explains, in the same manner as for the reset handler 511, the operation of the CPU 101 performed when the interrupt handler 512 is executed, with reference to the flow chart in FIG. 9.

The CPU 101 inquires of the interrupt controller 107 about the cause of the interrupt (Step S501). When the cause of the interrupt is the hardware managed by the OS 1 108 (Step S502: HARDWARE MANAGED BY OS 1), the CPU 101 branches to the device driver 201a, and performs process by the device driver 201a (Step S504).

When the cause of the interrupt is the hardware managed by the OS 2 109 (Step S502: HARDWARE MANAGED BY OS 2), the CPU 101 branches to the software interrupt handler 513 (Step S503).

The Software Interrupt Handler 513

Figure 10:
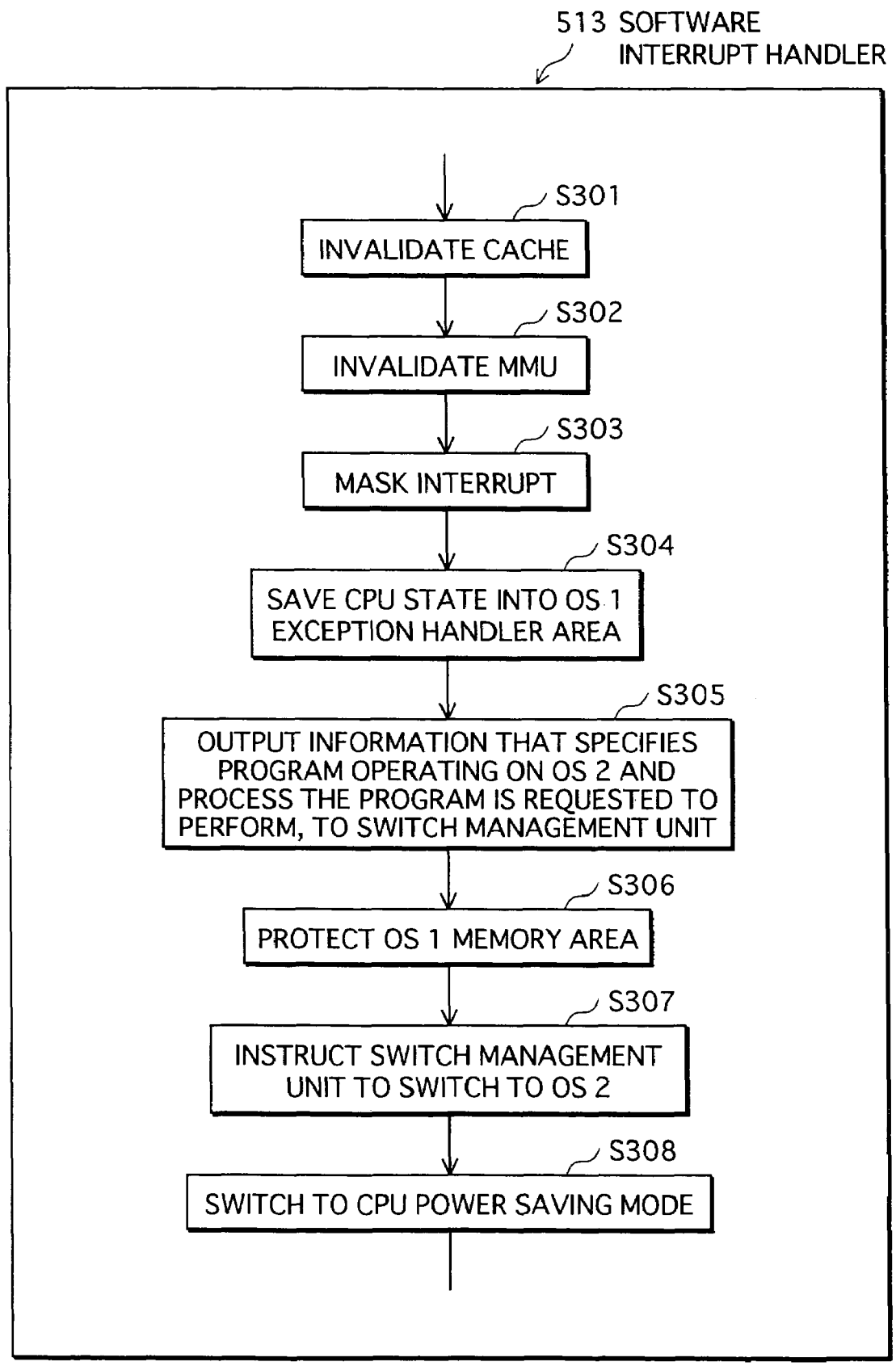
FIG. 10 shows the operation of the CPU 101 performed when the software interrupt handler 513 is executed.

As for the software interrupt handler 513, the following describes in the similar way the operation of the CPU 101 performed when the software interrupt handler 513 is executed, with reference to the flow chart in FIG. 10.

The CPU 101 invalidates the MMU 302 (Step S301), and invalidates the cache 303 (Step S302). The CPU 101 further sets a predetermined bit of the current status register (csr) 411 so as to mask an interrupt (Step S303).

The CPU 101 then saves the state of the CPU into the OS 1 exception handler area 503 (Step S304), outputs, to the switch management unit 106, information that specifies one of the programs operating on the OS 2 (one of the programs 204a through 204n shown in FIG. 2) as well as what process the program is requested to perform (Step S305).

Next, the CPU 101 instructs the switch management unit 106 to protect the OS 1 memory area 504 (Step S306), and further instructs the switch management unit 106 to switch to the OS 2 (Step S307). Subsequently, the CPU 101 advances to a process of switching to the power saving mode (Step S308).

The Process of Switching to the Power Saving Mode

Figure 11:
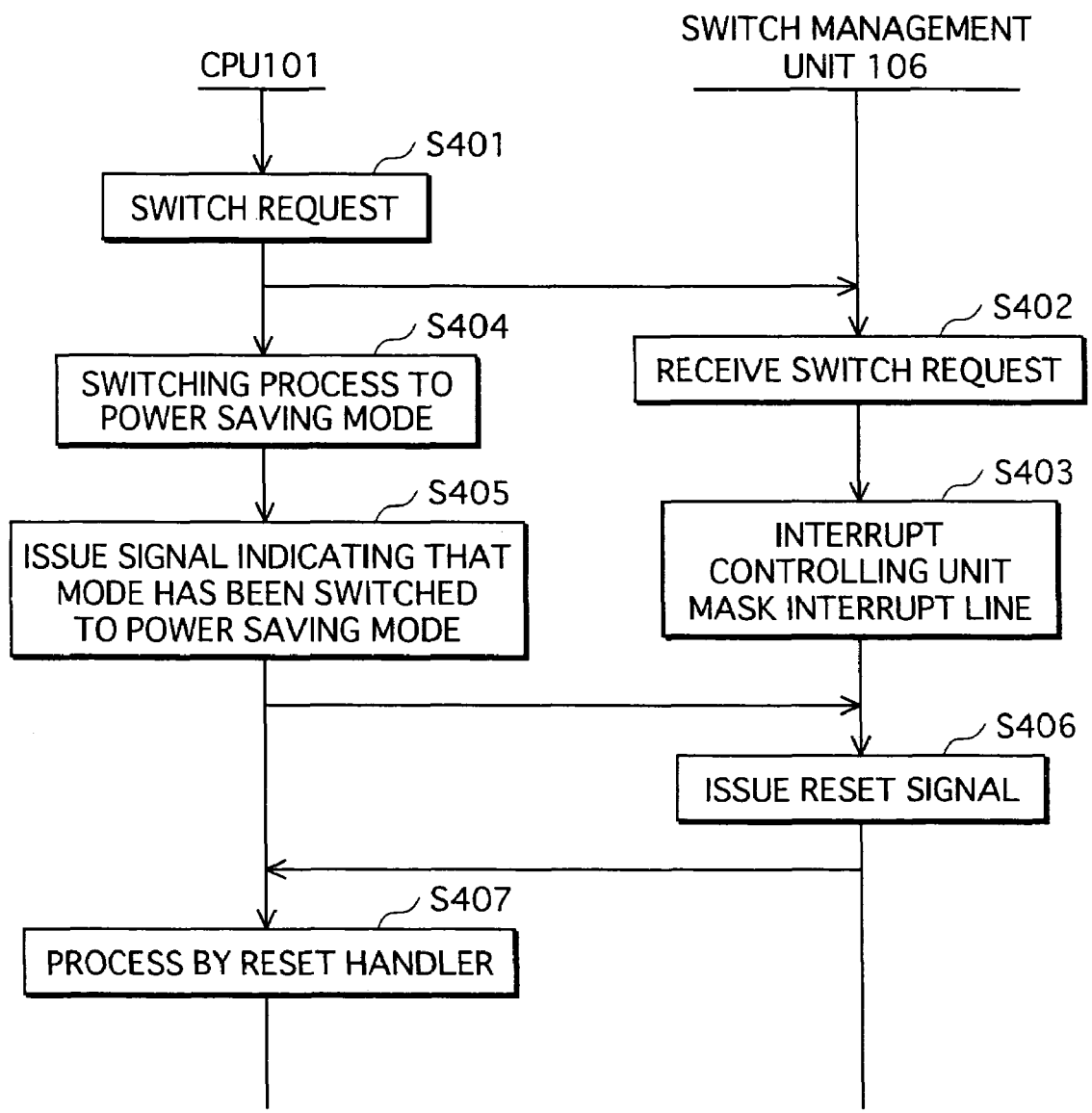
FIG. 11 shows the operation during the process of switching into a CPU power saving mode.

The following describes the process of switching to the power saving mode performed by the CPU 101, based on the operations of the CPU 101 and the switch management unit 106, with reference to the flow chart in FIG. 11.

When the CPU 101 makes an OS switch request to the switch management unit 106 (Step S401), the switch management unit 106 receives the OS switch request (Step S402), and has the under-mentioned interrupt controlling unit 705 mask the interrupt signal (Step S403).

After executing the OS switch request, the CPU 101 performs the process of switching to the power saving mode (Step S404). Subsequently, when the mode has been switched to the power saving mode, the CPU 101 outputs a signal that indicates that the mode has been switched to the power saving mode to the switch management unit 106 (Step S405).

Having received the signal indicating that the mode has been switched to the power saving mode, the switch management unit 106 instructs the CPU 101 to reset the CPU 101 (Step S406).

Having received an exception signal from the switch management unit 106, the CPU 101 clears the inside of the CPU 101 and advances to a reset handler process (Step S407).

It should be noted that in the case where the CPU 101 has been interacting with an external device before the mode is switched to the power saving mode in Step S404, the process of switching the mode to the power saving mode is performed after the interaction with the external device is ended.

(b) The OS 1 Memory Area 504

The programs and data constituting the OS 1 as well as the programs (202a through 202n) and data that operate on the OS 1 are loaded onto the OS 1 memory area 504.

(c) The OS 2 Exception Handler Area 505

The OS 2 exception handler area 505 stores therein a reset handler, an interrupt handler, a software interrupt handler, a device driver 203a, a device driver 203b, and a previous state of the CPU.

The operation performed by the reset handler stored in the OS 2 exception handler area 505 is not shown in the drawing; however, the flow chart shown in FIG. 8 is applicable when "OS 1" is read as "OS 2", and "OS 2" is read as "OS 1" in the steps S202, S206, and S209.

The operation performed by the interrupt handler stored in the OS 2 exception handler area 505 is not shown in the drawing either; however, the flow chart shown in FIG. 9 is applicable when "OS 1" is read as "OS 2", and "OS 2" is read as "OS 1" in the steps S502, S505, S506, S507, and S508, and "DEVICE DRIVER 201a" is read as "DEVICE DRIVER 203a" in Step S509.

The operation performed by the software interrupt handler stored in the OS 2 exception handler area 505 is not shown in the drawing either; however, the flow chart shown in FIG. 10 is applicable when "OS 1" is read as "OS 2", and "OS 2" is read as "OS 1" in the steps S304, S305, S306, and S307.

(d) The OS 2 Memory Area 506

The programs and data constituting the OS 2 as well as the programs (204a through 204n) and data that operate on the OS 2 are loaded onto the OS 2 memory area 506.

It should be noted that no memory area being accessible for both the OS 1 and the OS 2 is provided in the present embodiment; however, it is also acceptable to provide such a memory area.

(3) The Exception Table Switching Unit 103

The exception table switching unit 103 includes a switch that connects the bus 110 with the OS 1 exception table storing unit 104 and a switch that connects the bus 110 with the OS 2 exception table storing unit 105.

The exception table switching unit 103 receives an exception table controlling signal supplied by the switch management unit 106. When the exception table controlling signal indicates the "OS 1", the exception table switching unit 103 controls the switch so that the bus 110 is connected with the OS 1 exception table storing unit 104. When the exception table controlling signal indicates the "OS 2", the exception table switching unit 103 controls the switch so that the bus 110 is connected with the OS 2 exception table storing unit 105.

(4) The OS 1 Exception Table Storing Unit 104

Figure 12A:
FIG. 12A shows the data configuration of the OS 1 exception table 601.

FIG. 12A shows the OS 1 exception table 601 stored in the OS 1 exception table storing unit 104.

As shown in the drawing, each of the entries in the OS 1 exception table 601 describes a branch instruction corresponding to an exception cause. For example, a branch instruction corresponding to a "reset" is "BL0x0000AAAA" that indicates a branch to the address "0000AAAA". As shown in FIG. 7, the address "0000AAAA" is within the OS 1 exception handler area 503 and is of the position at which the reset handler 511 is located.

When an exception occurs while the OS 1 is operating, the CPU 101 refers to the OS 1 exception table 601, accesses the entry corresponding to the type of exception that has occurred, and executes the branch instruction.

(5) The OS 2 Exception Table Storing Unit 105

Figure 12B:
FIG. 12B shows the data configuration of the OS 2 exception table 602.

FIG. 12B shows the OS 2 exception table 602 stored in the OS 2 exception table storing unit 105.

As in the OS 1 exception table 601, each of the entries in the OS 2 exception table 602 describes a branch instruction corresponding to an exception cause. For example, a branch instruction corresponding to an "interrupt" is "BL0x0000FFFF" that indicates a branch to the address "0000FFFF". Each of the addresses indicated by the branch instructions shows a position within the OS 2 exception handler area 505.

When an exception occurs while the OS 2 is operating, the CPU 101 refers to the OS 2 exception table 602, accesses to the entry corresponding to the type of exception that has occurred, and executes the branch instruction.

(6) The Switch Management Unit 106

Figure 13:
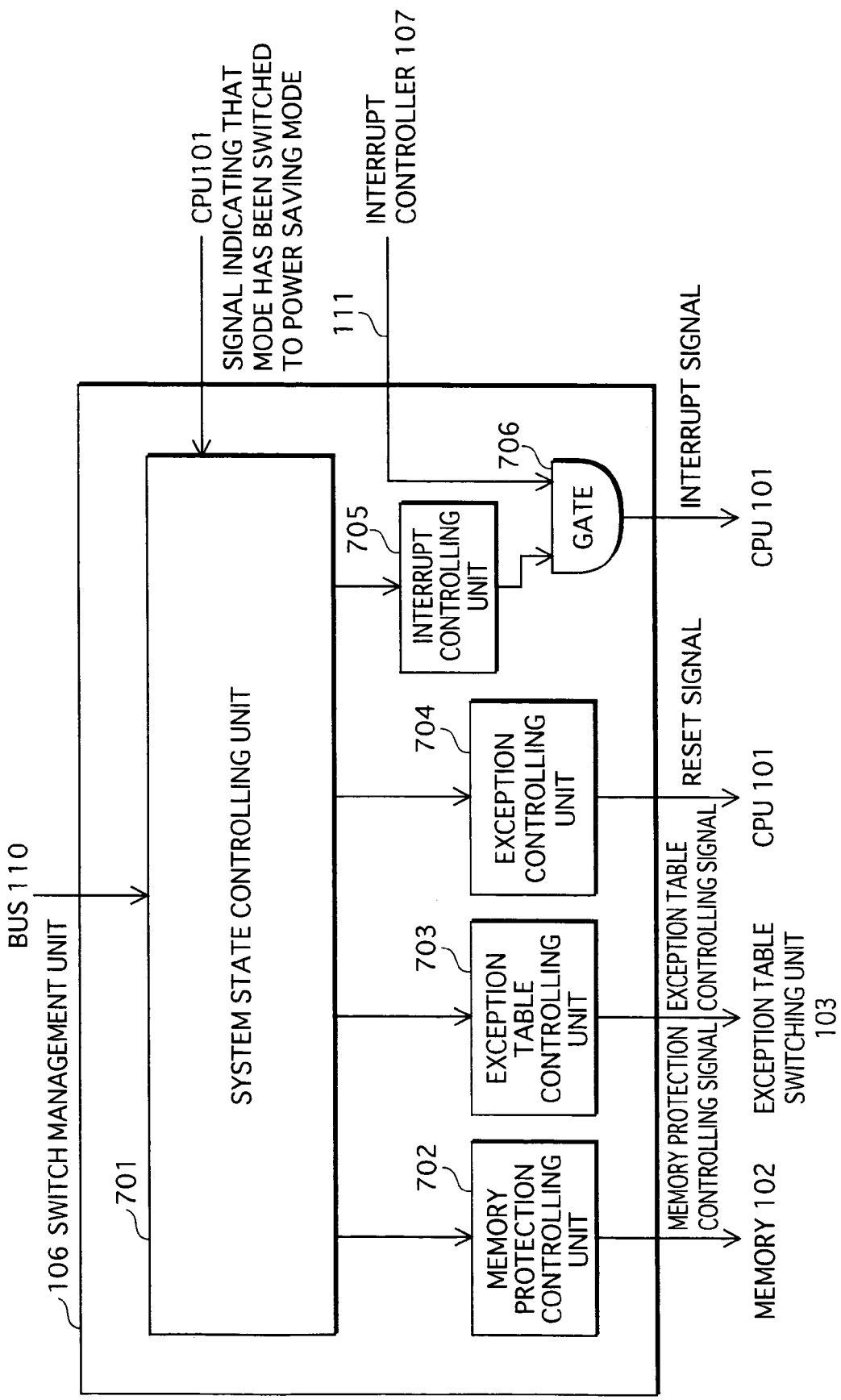
FIG. 13 shows the configuration of the switch management unit 106.

FIG. 13 shows the configuration of the switch management unit 106.

As shown in the drawing, the switch management unit 106 includes a system state management unit 701, a memory protection controlling unit 702, an exception table controlling unit 703, an exception controlling unit 704, and an interrupt controlling unit 705, and a gate 706.

The system state management unit 701 outputs instructions to the memory protection controlling unit 702, the exception table controlling unit 703, the exception controlling unit 704, and the interrupt controlling unit 705, according to the information received via the bus 110, as well as the information that is received from the CPU 101 and indicates that the mode has been switched to the power saving mode.

The memory protection controlling unit 702 outputs a signal for controlling the switches 507, 508, 509 and 510 to the memory 102, according to the instruction from the system state management unit 701.

The exception table controlling unit 703 outputs an exception table controlling signal to the exception table switching unit 103, according to the instruction from the system state management unit 701.

The exception controlling unit 704 outputs a reset signal to the CPU 101, according to the instruction from the system state management unit 701.

The interrupt controlling unit 705 controls the gate 706 according to the instruction from the system state management unit 701, and also controls the output of the interrupt signal 111 to the CPU 101, the interrupt signal having been received from the interrupt controller 107.

Figure 14:
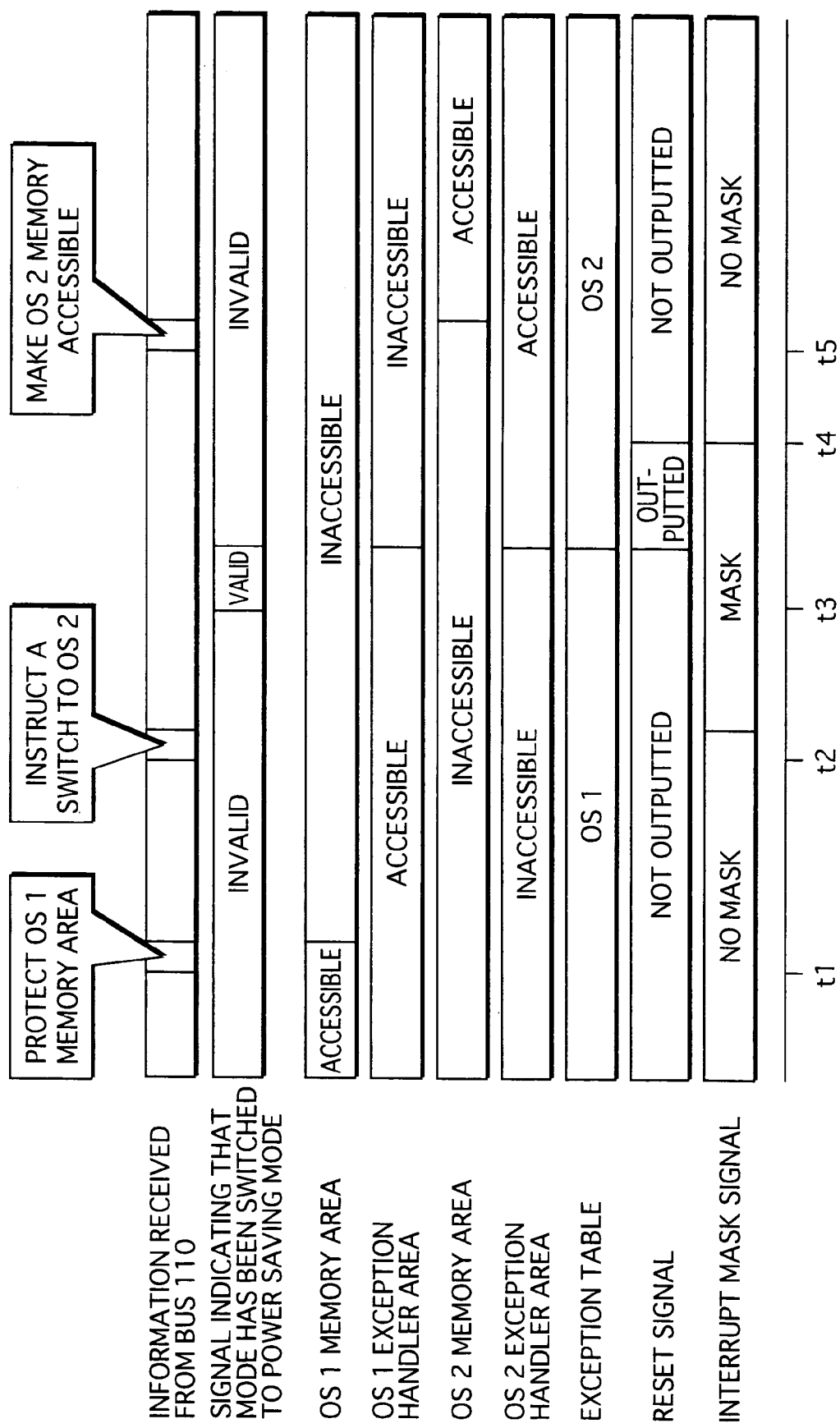
FIG. 14 is a sequence chart that shows the operation of the switch management unit 106.

FIG. 14 is a sequence chart that shows the operation performed by the system state management unit 701 in the case where the OS 1 is switched to the OS 2. In FIG. 14, time lapse is shown from the left to the right of the drawing (from t1 to t5). The following describes the operation of the system state management unit 701 along the time line.

Prior to t1: The system state management unit 701 instructs the memory protection controlling unit 702 to make the OS 1 exception handler area 503 and the OS 1 memory area 504 accessible and to make the OS 2 exception handler area 505 and the OS 2 memory area 506 inaccessible. The system state management unit 701 instructs the exception table controlling unit 703 to connect to the OS 1 exception table 601. The system state management unit 701 also instructs the exception controlling unit 704 not to output a reset signal and instructs the interrupt controlling unit 705 not to mask an interrupt.

t1: Having received a request to protect the OS 1 memory area (S306) via the bus 110, the system state management unit 701 instructs the memory protection controlling unit 702 to make the OS 1 memory area inaccessible.

t2: Having received the instruction to switch to the OS 2 via the bus 110, the system state management unit 701 instructs the interrupt controlling unit 705 to mask an interrupt.

t3: Having received a signal that indicates the mode has been switched to the power saving mode, from the CPU 101, the system state management unit 701 outputs an instruction for resetting the CPU 101 to the exception controlling unit 704. The system state management unit 701 instructs the memory protection controlling unit 702 to make the OS 1 exception handler area inaccessible and make the OS 2 exception handler area accessible. The system state management unit 701 also instructs the exception table controlling unit 703 to switch to the OS 2 exception table storing unit 105.

t4: When a sufficient period of time required for clearing the inside of the CPU 101 has passed, the system state management unit 701 outputs, to the exception controlling unit 704, an instruction to stop outputting the reset signal. The system state management unit 701 also outputs to the interrupt controlling unit 705 an instruction for releasing the interrupt mask.

t5: Having received a request to make the OS 2 memory area accessible (S206) via the bus 110, the system state management unit 701 instructs the memory protection controlling unit 702 to make the OS 2 memory area accessible.

The operation performed by the system state management unit 701 when the OS 2 is switched to the OS 1 is not shown in the drawing; however, the sequence chart shown in FIG. 14 is applicable when "OS 1" is read as "OS 2", and "OS 2" is read as "OS 1".

(7) The Interrupt Controller 107

Having received an interrupt from the hardware managed by the OS 1 108 and the hardware managed by the OS 2 109, the interrupt controller 107 informs the switch management unit 106 that an interrupt has occurred via the interrupt signal 111. Further, in response to inquiries from the interrupt handler 512 (for the OS 1) and the interrupt handler (for the OS 2) about the cause of the interrupt, the interrupt controller 107 informs these handlers of the cause of the interrupt.

Operation

Figure 15:
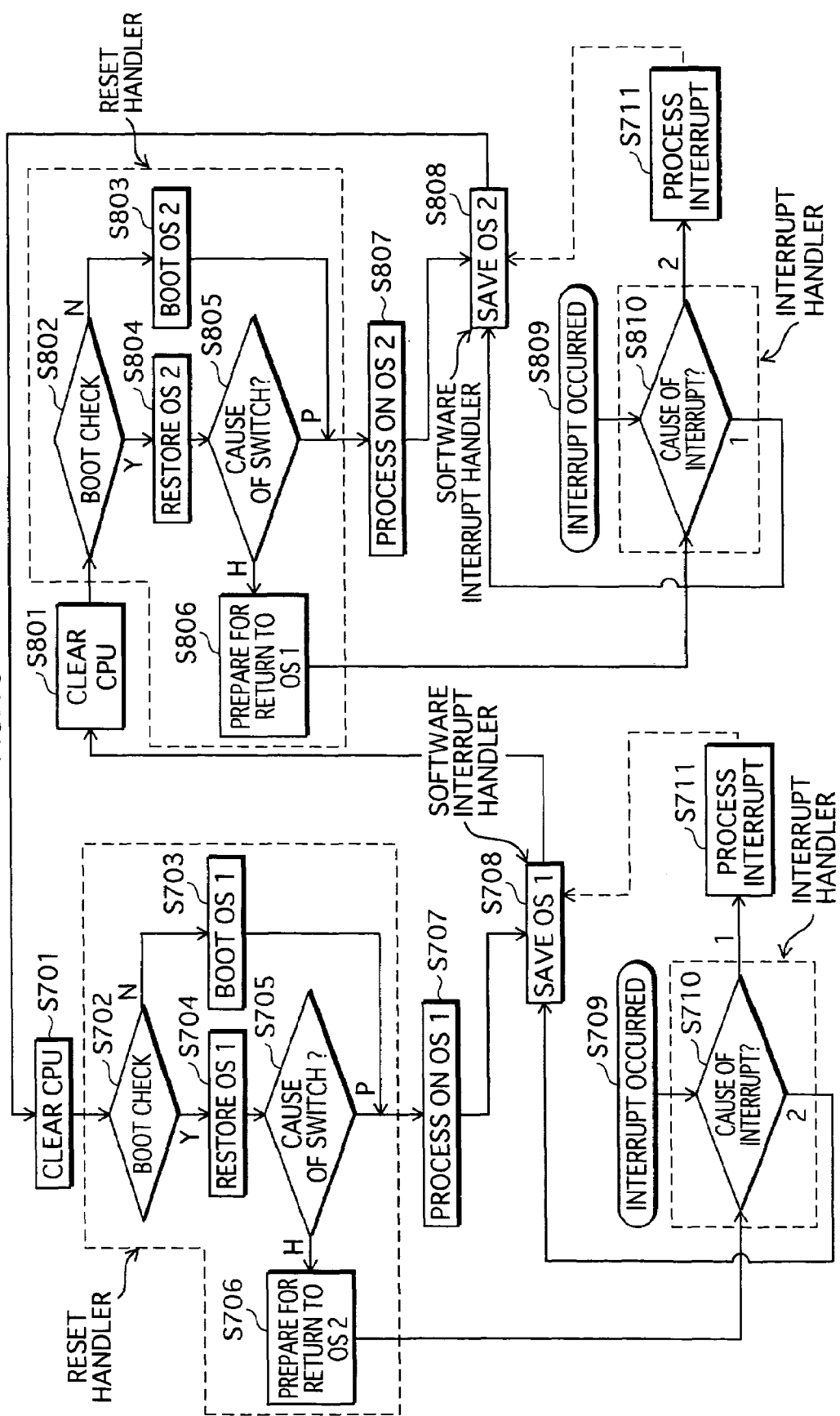
FIG. 15 is a flow chart that shows the operation of the information processing apparatus 100 as a whole.

FIG. 15 is a flow chart that shows the operation of the information processing apparatus 100 as a whole. The following describes the operation of the information processing apparatus 100 with reference to FIG. 15. It should be noted that the description starts with the process in Step S702, for convenience of explanation.

The information processing apparatus 100 performs a boot check on the OS 1 (Step S702). When the OS 1 is not booted (Step S702: No), the information processing apparatus 100 boots the OS 1 (Step S703), and the procedure advances to Step S707. When the OS 1 is booted (Step S702: Yes), the information processing apparatus 100 reads the previous state of the CPU from the OS 1 exception handler area 503, and restores the CPU to the previous state having the OS 1 in operation (Step S704).

The information processing apparatus 100 checks for the cause of the switch from the OS 2 to the OS 1. When the cause of the switch is an interrupt from the hardware managed by the OS 1 108 (Step S705: H), the information processing apparatus 100 prepares for a return to the OS 2 (Step S706), and subsequently the procedure advances to Step S710. When the cause of the switch is a process request to one of the programs operating on the OS 1 (Step S705: P), the information processing apparatus 100 performs the process for the requested program (Step S707). When it becomes necessary to switch back to the OS 2 later, the information processing apparatus 100 performs the process of saving the OS 1 (Step S708).

On the other hand, when an interrupt from hardware occurs while the information processing apparatus 100 is operating under the management of the OS 1, (Step S709), the information processing apparatus 100 checks for the cause of the interrupt (Step S710). When the cause of the interrupt is hardware managed by the OS 2 (Step S710: 2), the procedure advances to Step S708. When the cause of the interrupt is hardware managed by the OS 1 (Step S710: 1), the information processing apparatus 100 performs a process in response to the interrupt with the device driver 201a (Step S711). In the case where the preparation for returning to the OS 2 has been made in Step S706, the procedure advances to Step S708.

After the process of saving the OS 1 is performed in Step S708, the information processing apparatus 100 clears the inside of the CPU 101 (Step S801) and performs a boot check on the OS 2 (Step S802). When the OS 2 is not booted (Step S802: N), the information apparatus 100 boots the OS 2 (Step S803), and the procedure advances to Step S807. When the OS 2 is booted (Step S802: Y), the information processing apparatus 100 reads the previous state of the CPU from the OS 2 exception handler area 505, and restores the CPU 101 to the previous state having the OS 2 in operation (Step S804).

The information processing apparatus 100 checks for the cause of the switch from the OS 1 to the OS 2. When the cause of the switch is an interrupt from the hardware managed by the OS 2 109 (Step S805: H), the information processing apparatus 100 prepares for a return to the OS 1 (Step S806), and subsequently the procedure advances to Step S810. When the cause of the switch is a process request to one of the programs operating on the OS 2 (Step S805: P), the information processing apparatus 100 performs the process for the requested program (Step S807). When it becomes necessary to switch back to the OS 1 later, the information processing apparatus 100 performs the process of saving the OS 2 (Step S808).

On the other hand, when an interrupt from hardware occurs while the information processing apparatus 100 is operating under the management of the OS 2 (Step S909), the information processing apparatus 100 checks for the cause of the interrupt (Step S810). When the cause of the interrupt is the hardware managed by the OS 1 (Step S810: 1), the procedure advances to Step S808. When the cause of the interrupt is hardware managed by the OS 2 (Step S810: 1), the information processing apparatus 100 performs a process in response to the interrupt with the device driver 203*a* (Step S811). In the case where the preparation for returning to the OS 1 has been made in Step S806, the procedure advances to Step S808.

After the process of saving the OS 2 is performed in Step S808, the information processing apparatus 100 clears the inside of the CPU 101 (Step S701) and the procedure returns to Step S702 and the process continues.

Here, the process from Step S702 through Step S706 indicated with the broken line is performed by executing the OS 1 reset handler 511. The process of saving the OS 1 in Step S708 is performed by executing the software interrupt handler 513 for the OS 1. The process of checking the cause of the interrupt in Step S710 is performed by executing the interrupt handler 512 for the OS 1.

In the similar manner, the process from Step S802 through Step S806 indicated with the broken line is performed by executing the OS 2 reset handler. The process of saving the OS 2 in Step S808 is performed by executing the software interrupt handler for the OS 2. The process of checking the cause of the interrupt in Step S810 is performed by executing the interrupt handler for the OS 2.

Second Embodiment

The following describes the information processing apparatus 100*a* as the second embodiment of the present invention, with reference to the drawings.

Configuration

Figure 16:
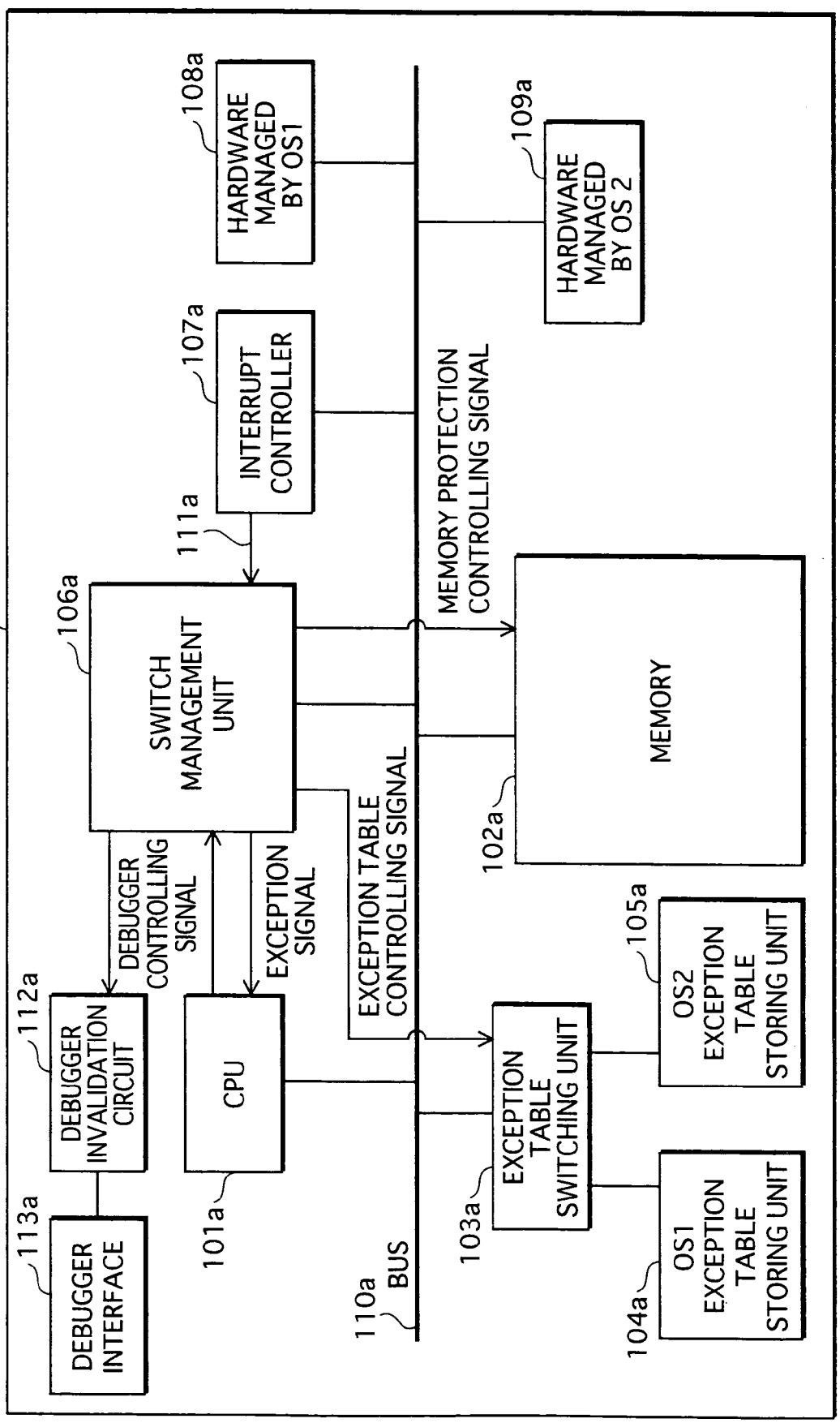
FIG. 16 is a functional block diagram that shows the configuration of the information processing apparatus 100a in terms of its functions.

FIG. 16 is a functional block diagram that shows the configuration of the information processing apparatus 100*a* in terms of its functions.

As shown in the drawing, the information processing apparatus 100*a* comprises: a CPU 101*a*; a memory 102*a*; an exception table switching unit 103*a*, an OS 1 exception table storing unit 104*a*; an OS 2 exception table storing unit 105*a*; a switch management unit 106*a*, an interrupt controller 107*a*, hardware managed by the OS 1 108*a*, hardware managed by the OS 2 109*a*, a bus 110*a*, a debugger invalidation circuit 112*a*, and a debugger interface 113*a*.

The difference from the configuration of the information processing apparatus 100 is that the information processing apparatus 100*a* comprises the debugger invalidation circuit 112a and the debugger interface 113*a*.

Explanation on the CPU 101*a*, the exception table switching unit 103*a*, the OS 1 exception table storing unit 104*a*, the OS 2 exception table storing unit 105*a*, the interrupt controller 107*a*, the hardware managed by the OS 1 108*a*, the hardware managed by the OS 2 109*a*, and the bus 110*a* is omitted since they have the same configuration and functions as the CPU 101, the exception table switching unit 103, the OS 1 exception table storing unit 104, the OS 2 exception table storing unit 105, the interrupt controller 107, the hardware managed by the OS 1 108, and the hardware managed by the OS 2 109 that are included in the information processing apparatus 100 of the first embodiment.

(1) The Memory 102*a*

Figure 17:
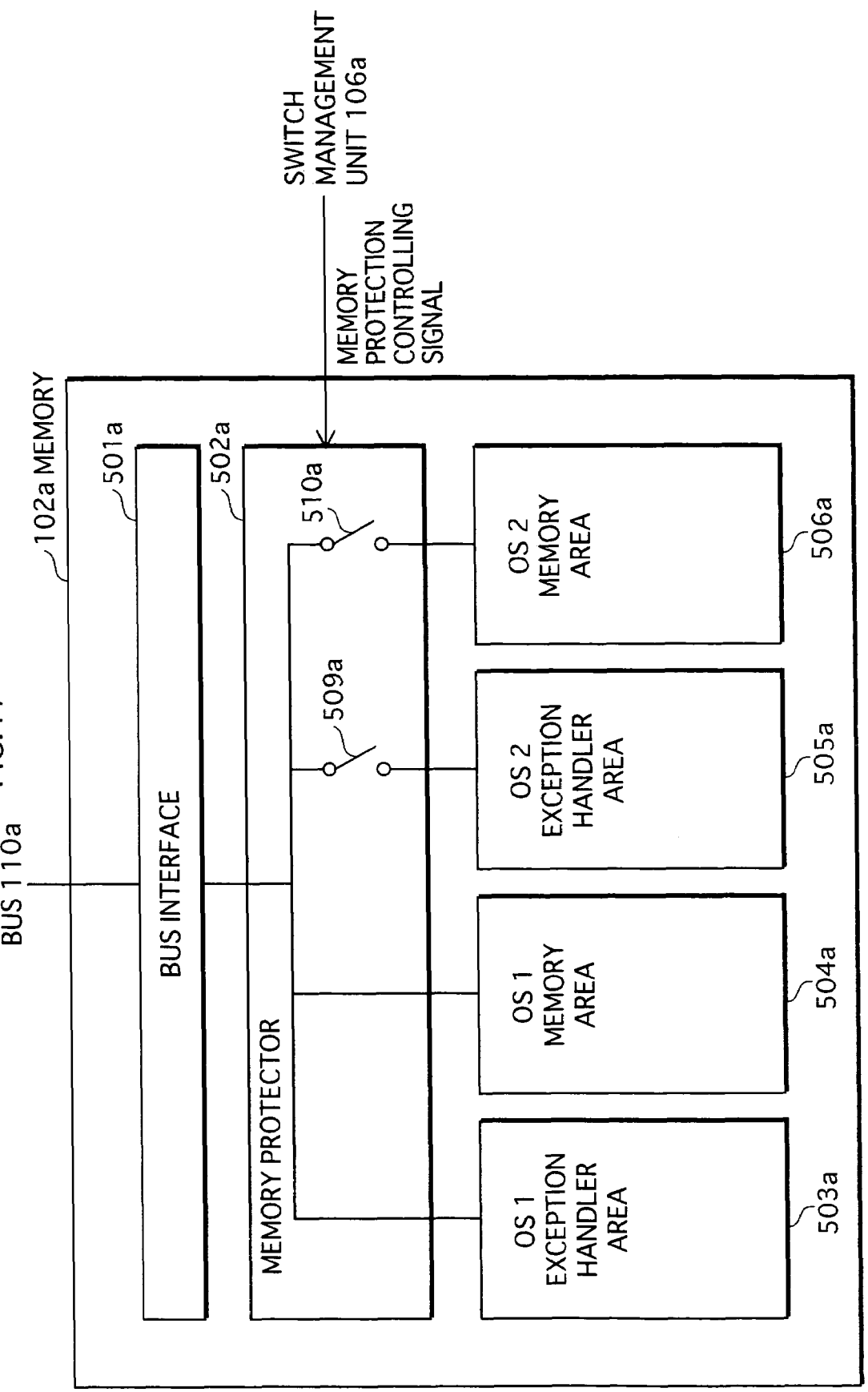

FIG. 17 shows the configuration of the memory 102*a*.

Like the memory 102, the memory 102*a* includes a bus interface 501*a*, a memory protector 502*a*, the OS 1 exception handler area 503*a*, the OS 1 memory area 504*a*, the OS 2 exception handler area 505*a*, and the OS 2 memory area 506*a*.

The memory protector 502*a* includes: the switch 509*a* provided between the bus interface 501*a* and the OS 2 exception handler area 505*a*; and the switch 510*a* provided between the bus interface 501*a* and the OS 2 memory area 506*a*.

The memory protector 502*a* receives a memory protection controlling signal issued by the switch management unit 106*a* and opens or closes the switch 509*a* and the switch 510*a* according to the received memory protection controlling signal, so that the OS 2 exception handler area 505*a* and the OS 2 memory area 506*a* that are connected with the switches become inaccessible or accessible. In FIG. 17, the switch 509*a* and the switch 510*a* are open; therefore, the OS 2 exception handler 505*a* and the OS 2 memory area 506*a* are inaccessible. Each of the memory areas to which the access is allowed is accessible via the bus 110*a*. Each of the memory areas being protected is inaccessible via the bus 110*a*, and therefore the data stored inside these inaccessible memory areas is protected.

The differences from the first embodiment are that there is no switch provided between the bus interface 501*a* and the OS 1 exception handler area 503*a*, and in the similar manner, there is no switch provided between the bus interface 501*a* and the OS 1 memory area 504*a*. In other words, in the second embodiment, the OS 1 exception handler area 503*a* and the OS 1 memory area 504*a* are always accessible and thus it is possible to access these areas via the bus 110*a*.

(a) The OS 1 Exception Handler Area 503*a*

The OS 1 exception handler area 503*a* stores therein a reset handler, a device driver for operating the hardware managed by the OS 1 108*a*, an interrupt handler, OS 1 software interrupt handlers 801 and 802, and a previous state of the CPU.

The reset handler stored in the OS 1 exception handler area 503*a* is different from the reset handler 511 shown in FIG. 8; however, explanation is omitted since it is possible to realize the reset handler by performing a normal boot process of an operating system, the process employing a technique publicly known. Further, the interrupt handler stored in the OS 1 exception handler area 503*a* corresponds to the interrupt handler 512 shown in FIG. 9 when "DEVICE DRIVER 201*a*" in Step S509 is read as "a device driver that operates the hardware managed by the OS 1 108*a*".

The following describes the operation of the CPU 101a performed when the OS 1 software interrupt handlers 801 and 802 are executed, with reference to the flow chart shown in FIG. 18.

The OS 1 Software Interrupt Handler 801

The CPU 101a invalidates the cache (Step S901), and invalidates the MMU (Step S902). The CPU 101a further sets a predetermined bit of the current status register (csr) 411 so as to mask an interrupt (Step S903).

The CPU 101a then saves the state of the CPU into the OS 1 exception handler area 503a (Step S904), outputs, to the switch management unit 106a, information that specifies one of the programs operating on the OS 2 as well as what process the program is requested to perform (Step S905).

Next, the CPU 101a informs the switch management unit 106a of a return address (Step S906), instructs the switch management unit 106a to switch to the OS 2 (Step S907), and then proceeds to the process of switching the mode to the power saving mode (Step S908).

The OS 1 Software Interrupt Handler 802

The CPU 101a reads the previous state of the CPU from the OS 1 exception handler area 503a, and restores the CPU 101 to the previous state having the OS 1 in operation (Step S911). The CPU 101a then instructs the switch management unit 106a to validate the debugger (Step S912) and further validates the MMU (Step S913), and validates the cache (Step S914). Subsequently, the CPU 101a inquires of the switch management unit 106a about the cause of the switch.

When the cause of the switch is a process request to one of the programs operating on the OS 1 (Step S915: PROGRAM), the CPU 101a branches to the requested program (Step S916).

When the cause of the switch is an interrupt from the hardware managed by the OS 1 108a (Step S915: HARDWARE), the CPU 101a releases the interrupt mask (Step S917).

When having returned from the interrupt process later (Step S918), the CPU 101a jumps to Step S901 performed by the OS 1 software interrupt handler 801 and continues the process.

(b) The OS 2 Exception Handler Area 505a

The OS 2 exception handler area 505a stores therein an OS 2 reset handler 803, a device driver for operating the hardware managed by the OS 1 109a, an interrupt handler, OS 2 software interrupt handlers 804, and a previous state of the CPU.

The process performed by the interrupt handler stored in the OS 2 exception handler area 505a corresponds to Step S504 shown in FIG. 9 when "DEVICE DRIVER 201a" is read as "a device driver that operates the hardware managed by the OS 2 109a".

The OS 2 Reset Handler 803

Figure 19:
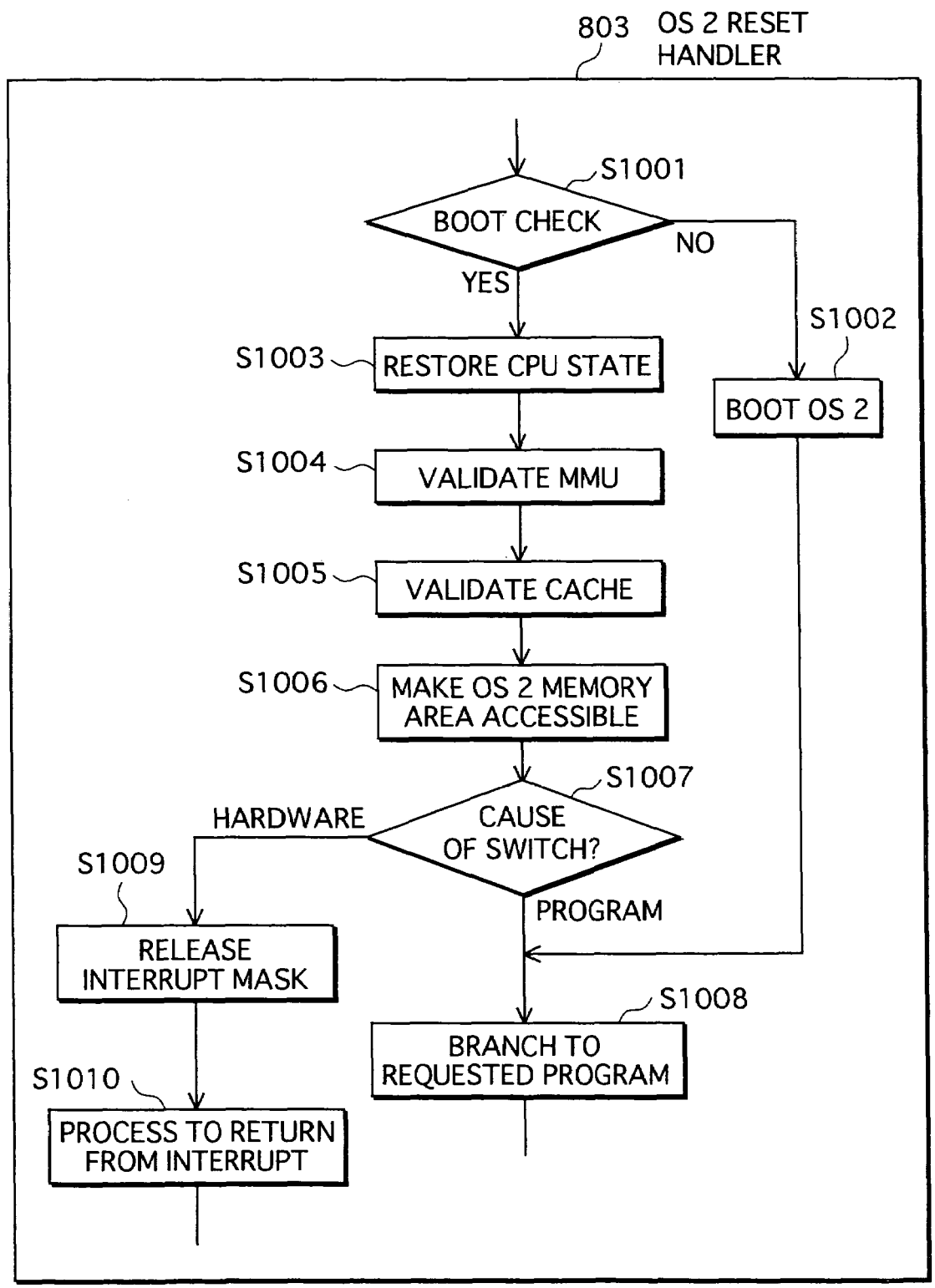
FIG. 19 shows the operation of the CPU 101a performed when the OS 2 reset handler 803 is executed.

The following describes the operation of the CPU 101a performed when the OS 2 reset handler 803 is executed, with reference to the flow chart in FIG. 19.

The CPU 101a performs a boot check so as to judge whether or not the OS 2 is booted (Step S1001). When the OS 2 is not booted (Step S1001: No), the CPU 101a boots the OS 2 (Step S1002), and the procedure advances to Step S1008.

When the OS 2 is booted (Step S1001: Yes), the CPU 101a reads the previous state of the CPU from the OS 2 exception handler area 505a in the memory 102a, and restores the CPU to the previous state (Step S1003). The CPU 101a validates the MMU (Step S1004), and validates the cache (Step S1005). Subsequently, the CPU 101a instructs the switch management unit 106a to make the OS 2 memory area 506a accessible (Step S1006) and further inquires of the switch management unit 106a about the cause of the switch.

When the cause of the switch is a process request to one of the programs operating on the OS 2 (Step S1007: PROGRAM), the CPU 101a branches to the requested program (Step S1008).

When the cause of the switch is an interrupt from the hardware managed by the OS 2 109a (Step S1007: HARDWARE), the CPU 101a releases the interrupt mask (Step S1009). When having returned from the interrupt process (Step S1010), the CPU 101a jumps to the under-mentioned OS 2 software interrupt handler 804 and continues the process.

The OS 2 Software Interrupt Handler 804

Figure 20:
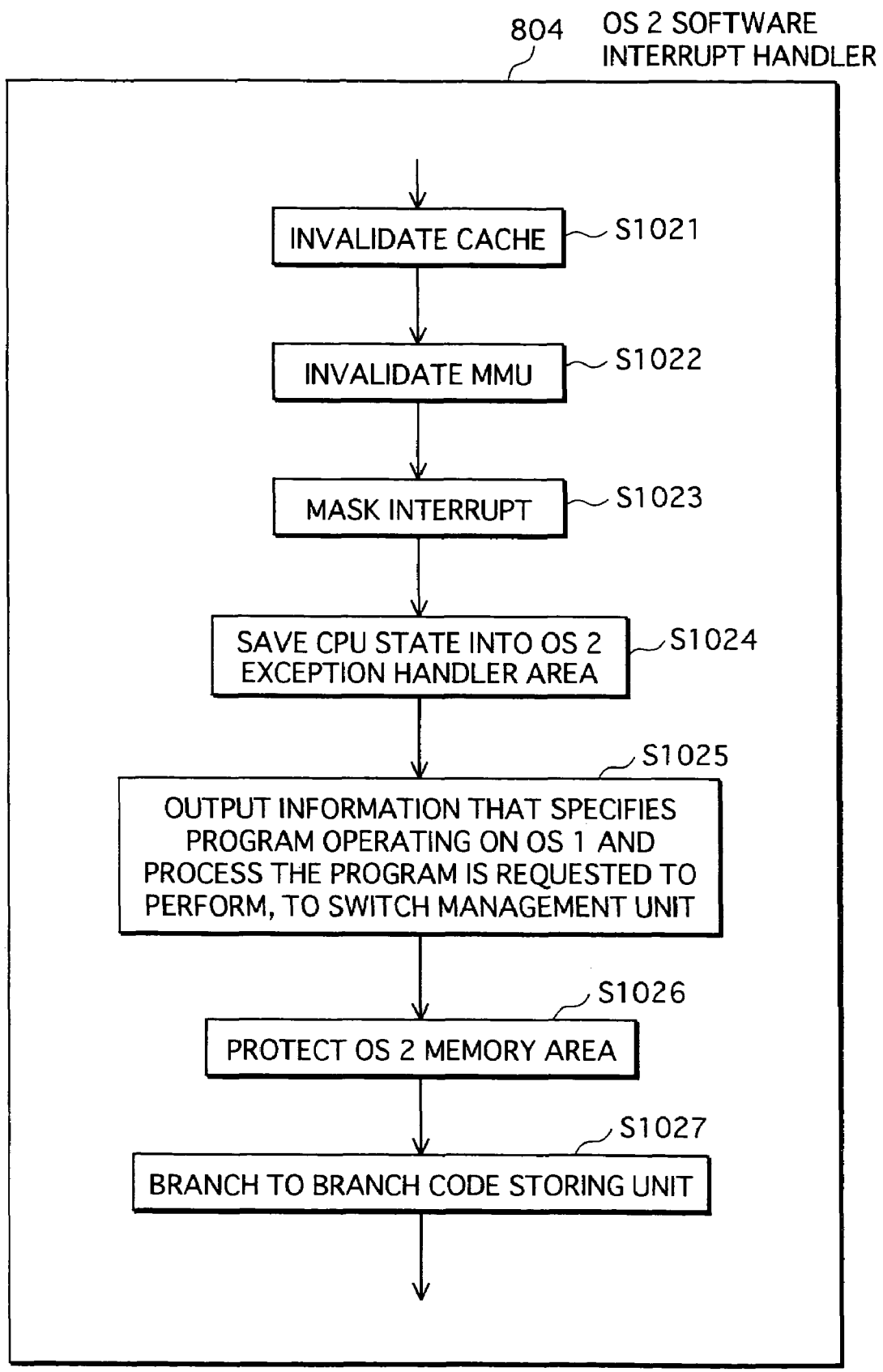
FIG. 20 is shows the operation of the CPU 101a performed when the OS 2 software interrupt handler 804 is executed.

The following describes the operation performed by the CPU 101a when the OS 2 software interrupt handler 804 is executed, with reference to the flow chart in FIG. 20.

The CPU 101a invalidates the MMU (Step S1021), and invalidates the cache (Step S1022). The CPU 101a further sets a predetermined bit of the current status register (csr) so as to mask an interrupt (Step S1023).

The CPU 101a then saves the state of the CPU into the OS 2 exception handler area 505a (Step S1024), outputs, to the switch management unit 106a, information that specifies one of the programs operating on the OS 1 as well as what process the program is requested to perform (Step S1025).

Further, the CPU 101a outputs an OS 2 memory area protection request to the switch management unit 106a (Step S1026), and branches to the branch code for the OS 1, which is stored in the under-mentioned branch code storing unit 709a (Step S1027). The branch target address included in the branch code stored in the branch code storing unit 709a is the address specified in Step S906 within the processes of the OS 1 software interrupt handler shown in FIG. 18.

(c) The OS 1 Memory Area 504a and the OS 2 Memory Area 506a

The programs and data constituting the OS 1 as well as the programs and data that operate on the OS 1 are loaded onto the OS 1 memory area 504a.

The programs and data constituting the OS 2 as well as the programs and data that operate on the OS 2 are loaded onto the OS 2 memory area 506a.

(2) Switch Management Unit 106a

Figure 21:
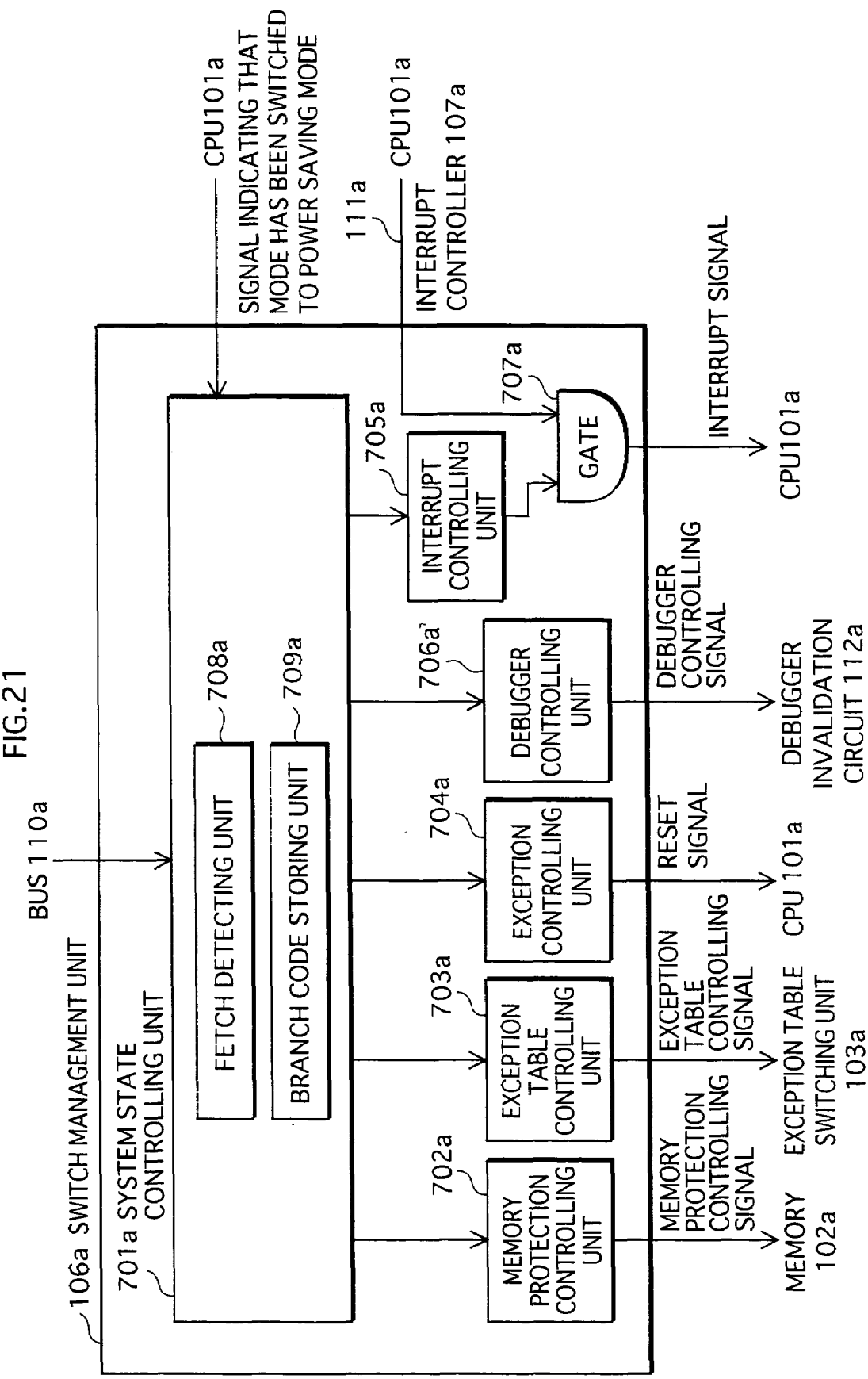

FIG. 21 shows the configuration of the switch management unit 106a.

As shown in the drawing, the switch management unit 106a includes a system state management unit 701a, a memory protection controlling unit 702a, an exception table controlling unit 703a, an exception controlling unit 704a, and an interrupt controlling unit 705a, a debugger controlling unit 706a, and a gate 707a.

The system state management unit 701a includes a fetch detecting unit 708a and a branch code storing unit 709a. The fetch detecting unit 708a is operable to detect that the branch code stored in the branch code storing unit 709a has been fetched by the CPU 101a. The branch code storing unit 709a stores therein a branch code that is to be executed by the CPU 101a when the OS 2 is switched to OS 1 and indicates branching to the OS 2 software interrupt handler 804. It should be noted it is acceptable that such a branch code is prestored in the branch code storing unit 709a. Alternatively, it is also acceptable that such a branch code is notified by the OS 1 to the OS 2 when the OS 1 is switched to the OS 2 and written onto the branch code storing unit 709a by the OS 2. It is also acceptable if such a branch code is written onto the branch code storing unit 709a by the OS 1. In such a case, the OS 1 is able to write the branch code, but is unable to read the branch code.

The system state management unit 701a outputs an instruction to each of the memory protection controlling unit 702a, the exception table controlling unit 703a, the exception controlling unit 704a, and the interrupt controlling unit 705a, and the debugger controlling unit 706a, depending on the information received via the bus 110a, the information that is received from the CPU 101a and indicates that the mode has been switched to the power saving mode, and detection of a fetch by the fetch detecting unit 708a.

The memory protection controlling unit 702a outputs a signal for controlling the switches 509a and 510a to the memory 102a, according to the instruction from the system state management unit 701a.

The exception table controlling unit 703a outputs an exception table controlling signal to the exception table switching unit 103a, according to the instruction from the system state management unit 701a.

The exception controlling unit 704a outputs a reset signal to the CPU 101a, according to the instruction from the system state management unit 701a.

The interrupt controlling unit 705a controls the gate 707a according to the instruction from the system state management unit 701a, and also control the output of the interrupt signal 111a to the CPU 101a the interrupt signal having been received from the interrupt controller 107a.

Figure 22:
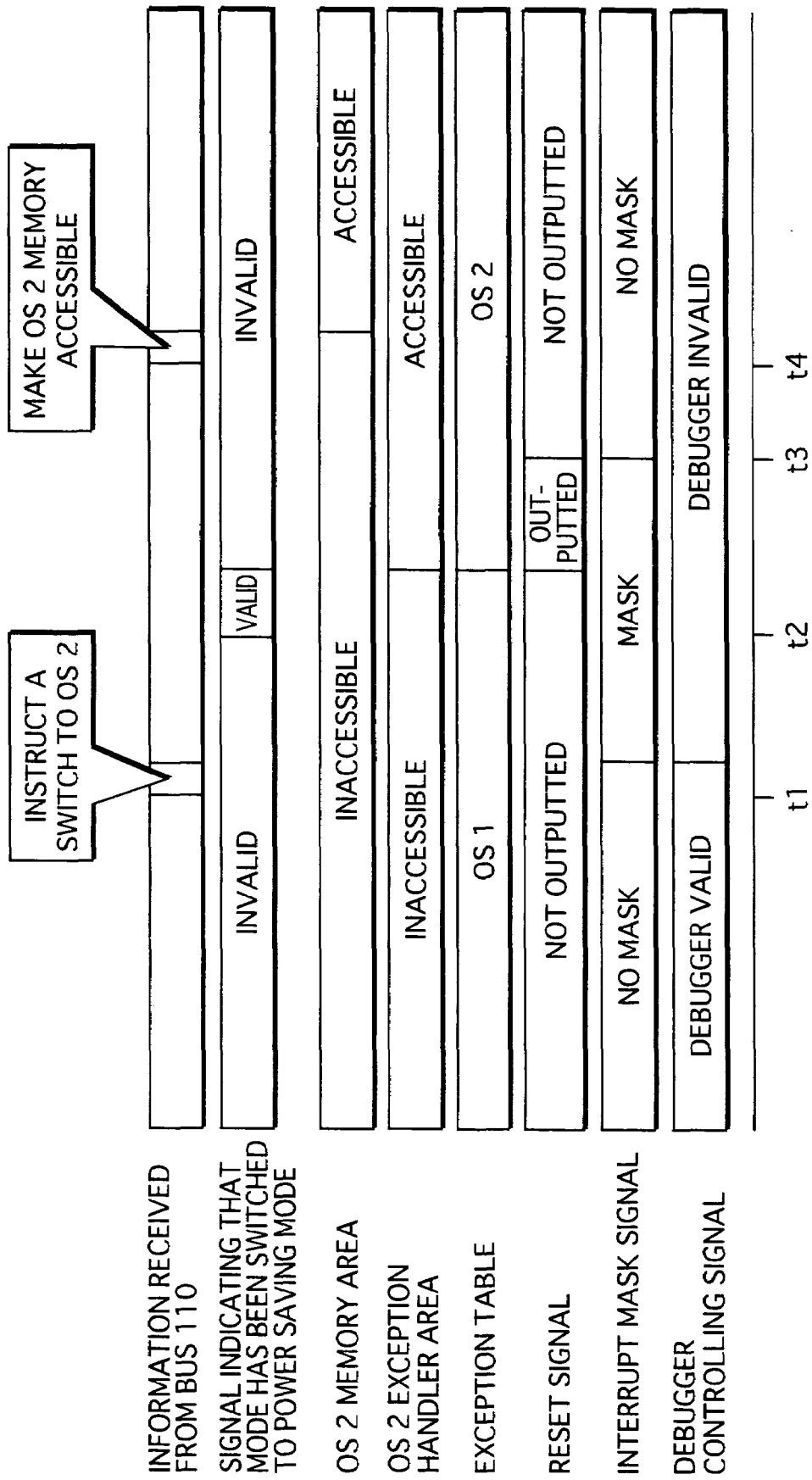
FIG. 22 is a sequence chart that shows the operation of the switch management unit 106a performed in a transition process from the OS 1 to the OS 2.

FIG. 22 is a sequence chart that shows the operation performed by the system state management unit 701a in the case where the OS 1 is switched to the OS 2. In FIG. 22, time lapse is shown from the left to the right of the drawing (from t1 to t4). The following describes the operation of the system state management unit 701a along the time line.

Prior to t1: The system state management unit 701a instructs the memory protection controlling unit 702a to make the OS 2 exception handler area 505a and the OS 2 memory area 506a inaccessible. The system state management unit 701a instructs the exception table controlling unit 703a to connect to the OS 1 exception table. The system state management unit 701a also instructs the exception controlling unit 704a not to output a reset signal and instructs the interrupt controlling unit 705a not to mask an interrupt. In addition, the system state management unit 701a instructs the debugger controlling unit 706a to validate the debugger.

t1: Having received a request to switch to the OS 2 via the bus 110 (Step S907), the system state management unit 701a instructs the interrupt controlling unit 705a to mask an interrupt. Also, the system state management unit 701a instructs the debugger controlling unit 706a to invalidate the debugger.

t2: Having received a signal that indicates the mode has been switched to the power saving mode, from the CPU 101a, the system state management unit 701a outputs an instruction for resetting the CPU 101a to the exception controlling unit 704a. The system state management unit 701a instructs the memory protection controlling unit 702a to make the OS 2 exception handler area accessible. The system state management unit 701a also instructs the exception table controlling unit 703a to switch to the OS 2 exception table storing unit.

t3: When a sufficient period of time required for clearing the inside of the CPU 101a has passed, the system state management unit 701a instructs the exception controlling unit 704a to stop outputting the reset signal and also instructs the interrupt controlling unit 705a to release the interrupt mask.

t4: Having received a request to make the OS 2 memory area accessible (Step S1006) via the bus 110a, the system state management unit 701a instructs the memory protection controlling unit 702a to make the OS 2 memory area accessible.

Figure 29:
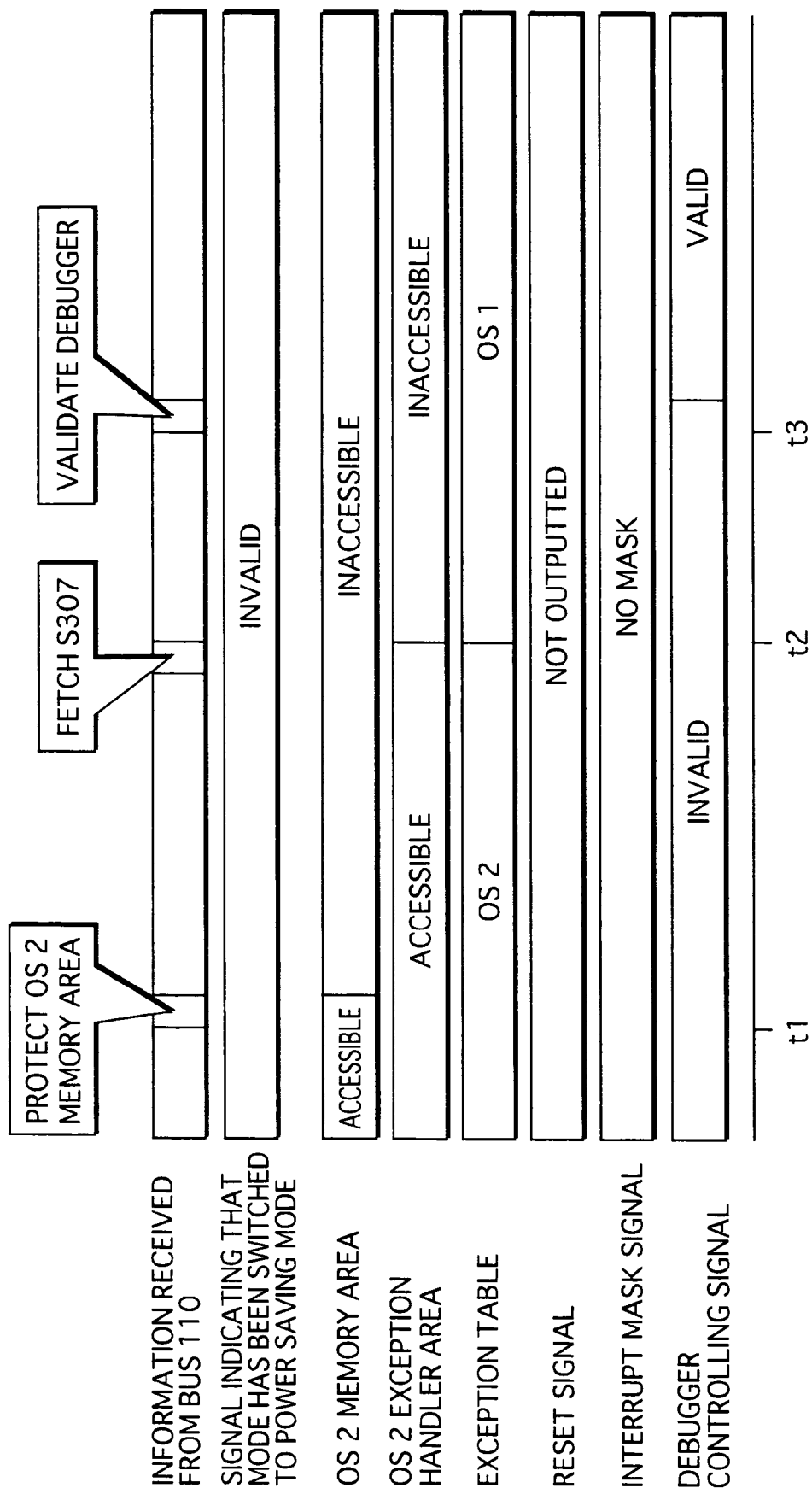
FIG. 29 is a sequence chart that shows the operation of the switch management unit 106a performed in a transition process from the OS 2 to the OS 1.

FIG. 29 is a sequence chart that shows the operation performed by the system state management unit 701a in the case where the OS 2 is switched to the OS 1. In FIG. 29, time lapse is shown from the left to the right of the drawing (from t1 to t3). The following describes the operation of the system state management unit 701a along the time line.

Prior to t1: The system state management unit 701a instructs the memory protection controlling unit 702a to make the OS 2 exception handler area 505a and the OS 2 memory area 506a accessible. The system state management unit 701a instructs the exception table controlling unit 703a to connect to the OS 2 exception table. The system state management unit 701a also instructs the exception controlling unit 704a not to output a reset signal and instructs the interrupt controlling unit 705a not to mask an interrupt. In addition, the system state management unit 701a instructs the debugger controlling unit 706a to invalidate the debugger.

t1: Having received a request to protect the OS 2 memory area (Step S1026) via the bus 110a, the system state management unit 701a instructs the memory protection controlling unit 702a to make the OS 2 memory area 506a inaccessible.

t2: When the fetch detecting unit 708a has detected that the branch code storing unit 709a has been accessed, the system state management unit 701a instructs the memory protection controlling unit 702a to make the OS 2 exception handler area 505a inaccessible and instructs the exception table controlling unit 703a to switch to the OS 1 exception table.

t3: Having received an instruction to validate the bugger via the bus 110a, the system state management unit 701a instructs the debugger controlling unit 706a to validate the debugger.

(3) The Debugger Invalidation Circuit 112a and the Debugger Interface 113a

The debugger invalidation circuit 112a is provided between the CPU 101a and the debugger interface 113a and is operable to connect/disconnect the CPU 101a to/from the debugger interface 113a.

Having received a debugger controlling signal that indicates "valid" from the switch management unit 106a, the debugger invalidation circuit 112a connects the CPU 101a to the debugger interface 113a. Having received a debugger controlling signal that indicates "invalid" from the switch management unit 106a, the debugger invalidation circuit 112a disconnects the CPU 101a from the debugger interface 113a.

When the CPU 101a is connected to the debugger interface 113a, debuggers connected externally to the debugger interface 113a are valid. When the CPU 101a is disconnected from the debugger interface 113a, debuggers connected externally to the debugger interface 113a are invalid. As a specific example, the debugger invalidation circuit 112a may be realized with switches as shown in FIG. 23.

The debugger interface 113a is an interface for connecting the information processing apparatus 100a with external debuggers.

FIG. 23 is a schematic illustration of a part of the information processing apparatus 100a to explain the relationship among the debugger invalidation circuit 112a, the CPU 101a, and the memory 102a.

FIG. 23A shows the state in which the OS 1 is in operation in the information processing apparatus 100a. When the OS 1 is in operation, the OS 2 exception handler area 505a and the OS 2 memory area 506a within the memory 102a are inaccessible, according to the memory protection controlling signal outputted from the switch management unit 106*a*. In such a case, the debugger invalidation circuit 112*a* receives a debugger controlling signal that indicates "valid" from the switch management unit 106*a* and closes the switch so that the debugger interface 113*a* is connected to the CPU 101*a*.

When the OS 2 is to be switched to the OS 1, it is acceptable that a point of time at which the switch management unit 106*a* fetches a branch code is judged to be a point of time at which the OS is switched, so that after the switch management unit 106*a* fetches the branch code, the debugger invalidation circuit 112*a* receives the debugger controlling signal that indicates "valid" outputted from the switch management unit 106*a*.

FIG. 23B shows the state in which the OS 2 is in operation in the information processing apparatus 100*a*. When the OS 2 is in operation, the OS 2 exception handler area 505*a* and the memory area 506*a* within the memory 102*a* are accessible, according to the memory protection controlling signal outputted from the switch management unit 106*a*. In such a case, the debugger invalidation circuit 112*a* receives a debugger controlling signal that indicates "invalid" from the switch management unit 106*a* and opens the switch so that the debugger interface 113*a* is disconnected from the CPU 101*a*.

Operation

Figure 24:
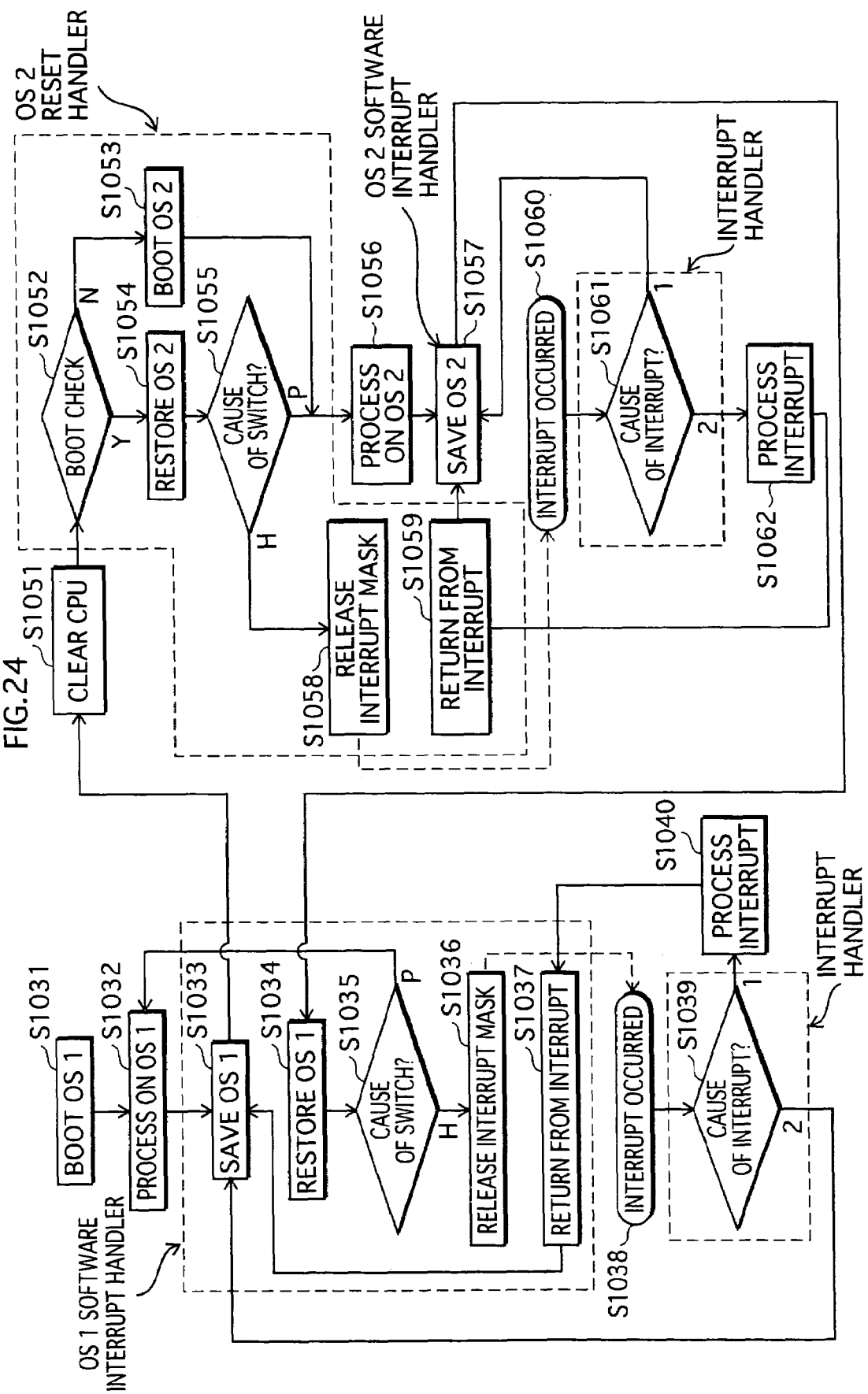
FIG. 24 is a flow chart that shows the operation of the information processing apparatus 100a as a whole.

FIG. 24 is a flow chart that shows the operation of the information processing apparatus 100*a* as a whole. The following describes the operation of the information processing apparatus 100*a* with reference to FIG. 24.

The information processing apparatus 100*a* performs a boot process on the OS 1 (Step S1031), and performs processing with the OS 1 (Step S1032). Subsequently, the information processing apparatus 100*a* performs the process of saving the OS 1 (Step S1033).

When the procedure has returned to the OS 1 (Step S1034), the information processing apparatus 100*a* checks for the cause of the switch from the OS 2 to the OS 1. When the cause of the switch is a process request to one of the programs operating on the OS 1 (Step S1035: P), the information processing apparatus jumps to Step S1032, and performs the requested process. When the cause of the switch is an interrupt from the hardware managed by the OS 1 108*a* (Step S1035: H), the information processing apparatus 100*a* releases the interrupt mask (Step S1036).

In the case where the interrupt controller 107*a* has outputted an interrupt signal, the CPU 101*a* accepts the interrupt immediately after the release of the interrupt mask (Step S1036), and the information processing apparatus 100*a* is in the state where an interrupt has occurred (Step S1038). Subsequently, the information processing apparatus 100*a* checks for the cause of the interrupt (Step S1039).

When the cause of the interrupt is an interrupt from the hardware managed by the OS 1 108*a* (Step S1039: 1), the information processing apparatus 100*a* performs a process in response to the interrupt with the device driver. When the interrupt process is finished, the information processing apparatus 100*a* executes a code following the code being executed when the interrupt has been accepted, and performs a process of returning from the interrupt (Step S1037). When having returned from the interrupt (Step S1037), the information processing apparatus 100*a* jumps to Step S1033 and performs a process of saving the OS 1.

When the cause of the interrupt is an interrupt from the hardware managed by the OS 2 109*a* (Step S1039: 2), the information processing apparatus 100*a* advances to Step S1033, without instructing the interrupt controller 107 to perform the process of clearing the interrupt cause.

In the case where an interrupt from the hardware managed by the OS 1 108*a* occurs while the information processing apparatus 100*a* is operating under management of the OS 1 (Step S1032), the information processing apparatus 100*a* performs a normal interrupt process of an operating system, which employs a technique publicly known; therefore explanation will be omitted.

After the process of saving the OS 1 is performed in Step S1033, the information processing apparatus 100*a* clears the inside of the CPU 101*a* (Step S1051) and performs a boot check of the OS 2 (Step S1052). When the OS 2 is not booted (Step S1052: N), the information processing apparatus 100*a* boots the OS 2 (Step S1053), and the procedure advances to Step S1056. When the OS 2 is booted (Step S1052: Y), the information processing apparatus 100*a* reads the previous state of the CPU from the OS 2 exception handler area 505*a* and restores the CPU to the previous state having the OS 2 in operation (Step S1054).

The information processing apparatus 100*a* checks for the cause of the switch from the OS 1 to the OS 2. When the cause of the switch is a process request to one of the programs operating on the OS 2 (Step S1055: P), the information processing apparatus 100*a* performs the process for the requested program (Step S1056). Subsequently, when it is necessary to perform processing on the OS 1, the information processing apparatus 100*a* performs a process of saving the OS 2 (Step S1057). When the cause of the switch is an interrupt from the hardware managed by the OS 2 109*a* (Step S805: H), the information processing apparatus 100*a* releases the interrupt mask (Step S1058).

In the case where the interrupt controller 107*a* has outputted an interrupt signal, the CPU 101*a* accepts the interrupt immediately after the release of the interrupt mask (Step S1059), and the information processing apparatus 100*a* is in the state where an interrupt has occurred (Step S1060). Subsequently, the information processing apparatus 100*a* checks for the cause of the interrupt (Step S1061).

When the cause of the interrupt is an interrupt from the hardware managed by the OS 2 109*a* (Step S1061: 2), the information processing apparatus 100*a* performs a process in response to the interrupt with the device driver (Step S1062). When the interrupt process is finished, the information processing apparatus 100*a* executes a code following the code being executed when the interrupt has been accepted and performs a process of returning from the interrupt (Step S1059). When having returned from the interrupt (Step S1059), the information processing apparatus 100*a* advances to the Step S1057 and performs a process of saving the OS 2.

When the cause of the interrupt is an interrupt from the hardware managed by the OS 1 108*a* (Step S1061: 1), the information processing apparatus 100*a* performs a process of saving the OS 2, without instructing the interrupt controller 107*a* to perform the process of clearing the interrupt cause (Step S1057). After performing the process of switching from the OS 2 to the OS 1, the information processing apparatus 100*a* performs a process of restoring the OS 1 (Step S1034).

When an interrupt from the hardware managed by the OS 2 109*b* has occurred while the information processing apparatus 100*a* is operating under management of the OS 2 (Step S1056), the information processing apparatus 100*a* performs a normal interrupt process of an operating system, which employs a technique publicly known; therefore, explanation will be omitted.

Here, the process from Step S1033 through Step S1037 indicated with the broken line is performed by executing the OS 1 software interrupt handlers 801 and 802. The process of checking the cause of the interrupt in Step S1039 is performed by executing the OS 1 interrupt handler.

In addition, the process indicated with the broken line out of the process from Step S1052 through Step S1059 is performed by executing the OS 2 reset handler 803. The process of saving the OS 2 in Step S1057 is performed by executing the OS 2 software interrupt handler 804. The process of checking the cause of the interrupt in Step S1062 is performed by executing the OS 2 interrupt handler.

MODIFICATION EXAMPLE 1

The information processing apparatus 100a of the second embodiment has an arrangement wherein the software inquires of the interrupt controller 107a about the cause of the interrupt; however, it is acceptable to have an arrangement wherein hardware checks for the cause of an interrupt. The following describes information processing apparatus 100b as a modification example of the information processing apparatus 100a.

Figure 25:
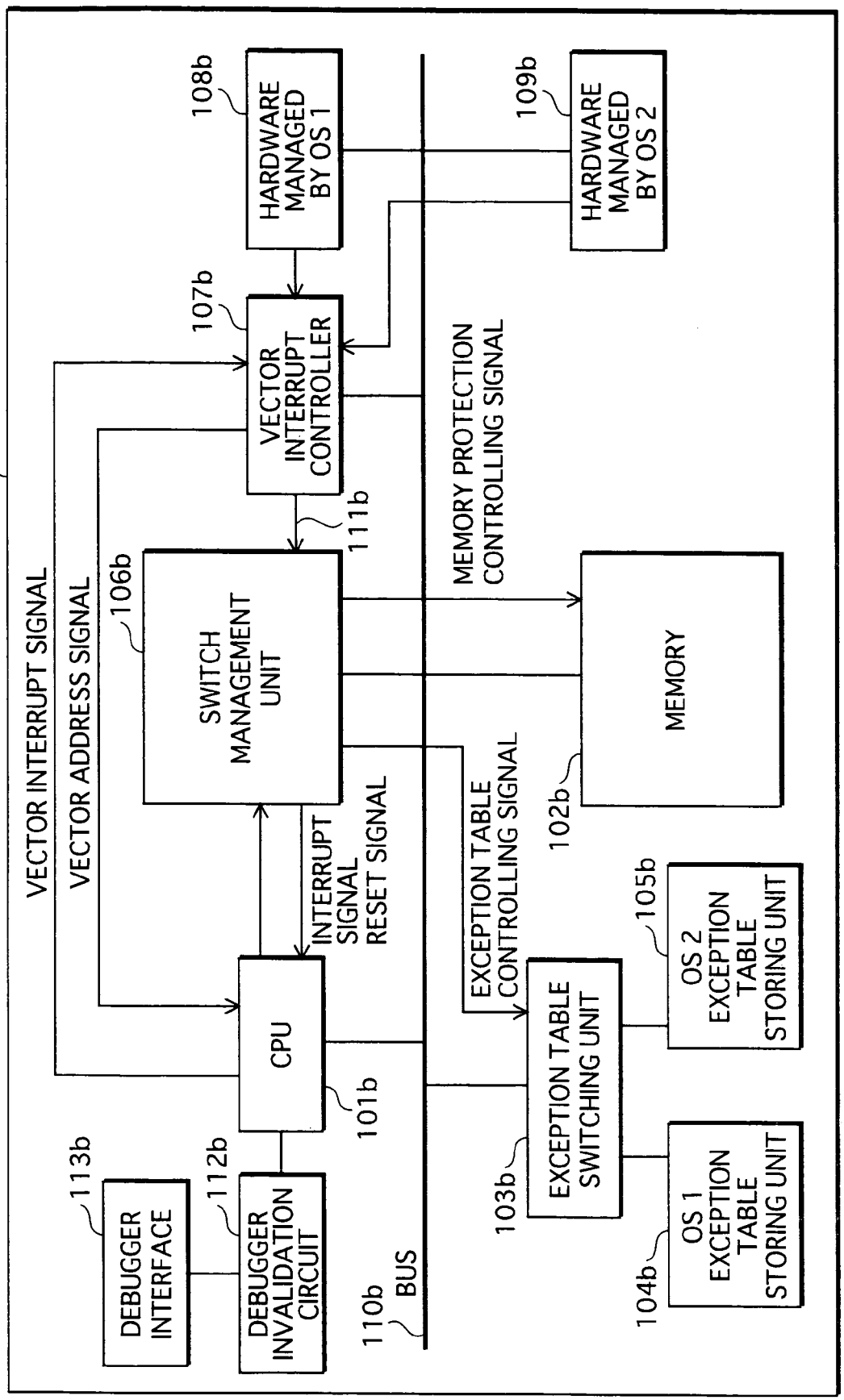
FIG. 25 is a functional block diagram that shows the configuration of the information processing apparatus 100b in terms of its functions.

FIG. 25 is a functional block diagram that shows the configuration of the information processing apparatus 100b in terms of its functions.

As shown in the drawing, the information processing apparatus 100b comprises: the CPU 101b, the memory 102b, the exception table switching unit 103b, the OS 1 exception table storing unit 104b, the OS 2 exception table storing unit 105b, the switch management unit 106b, the vector interrupt controller 107b, the hardware managed by the OS 1 108b, the hardware managed by the OS 2 109b, the bus 110b, the debugger invalidation circuit 112b, and the debugger interface 113b.

The information processing apparatus 100b differs from the information processing apparatus 100a in terms of the configuration in that it includes the vector interrupt controller 107b instead of the interrupt controller 107a. The following explanation is provided mainly on the differences between the information processing apparatus 100b and the information processing apparatus 100a.

(1) The Vector Interrupt Controller 107b

Like the interrupt controller 107a, the vector interrupt controller 107b includes an interrupt line that receives interrupts from the hardware managed by the OS 1 108b as well as an interrupt line that receives interrupts from the hardware managed by the OS 2 109b.

The vector interrupt controller 107b stores therein a table that shows correspondence between devices and addresses of device drivers. When having received an interrupt via the interrupt line, the vector interrupt controller 107b refers to the table, judges whether the device that has generated the interrupt is the hardware managed by the OS 1 108b or the hardware managed by the OS 2 109b, obtains a memory address at which the corresponding device is located, and notifies the obtained address to the CPU 101b.

It should be noted that it is possible to connect, to the vector interrupt controller 107b, a plurality of pieces of hardware, besides the hardware managed by the OS 1 108b and the hardware managed by the OS 2 109b. The vector interrupt controller 107b is able to notify an address that corresponds to each piece of hardware to the CPU 101b. More specifically, when the vector interrupt controller 107b is informed by a device that an interrupt has occurred, the CPU 101b branches to a device driver directly.

(2) The Switch Management Unit 106b

Figure 26:
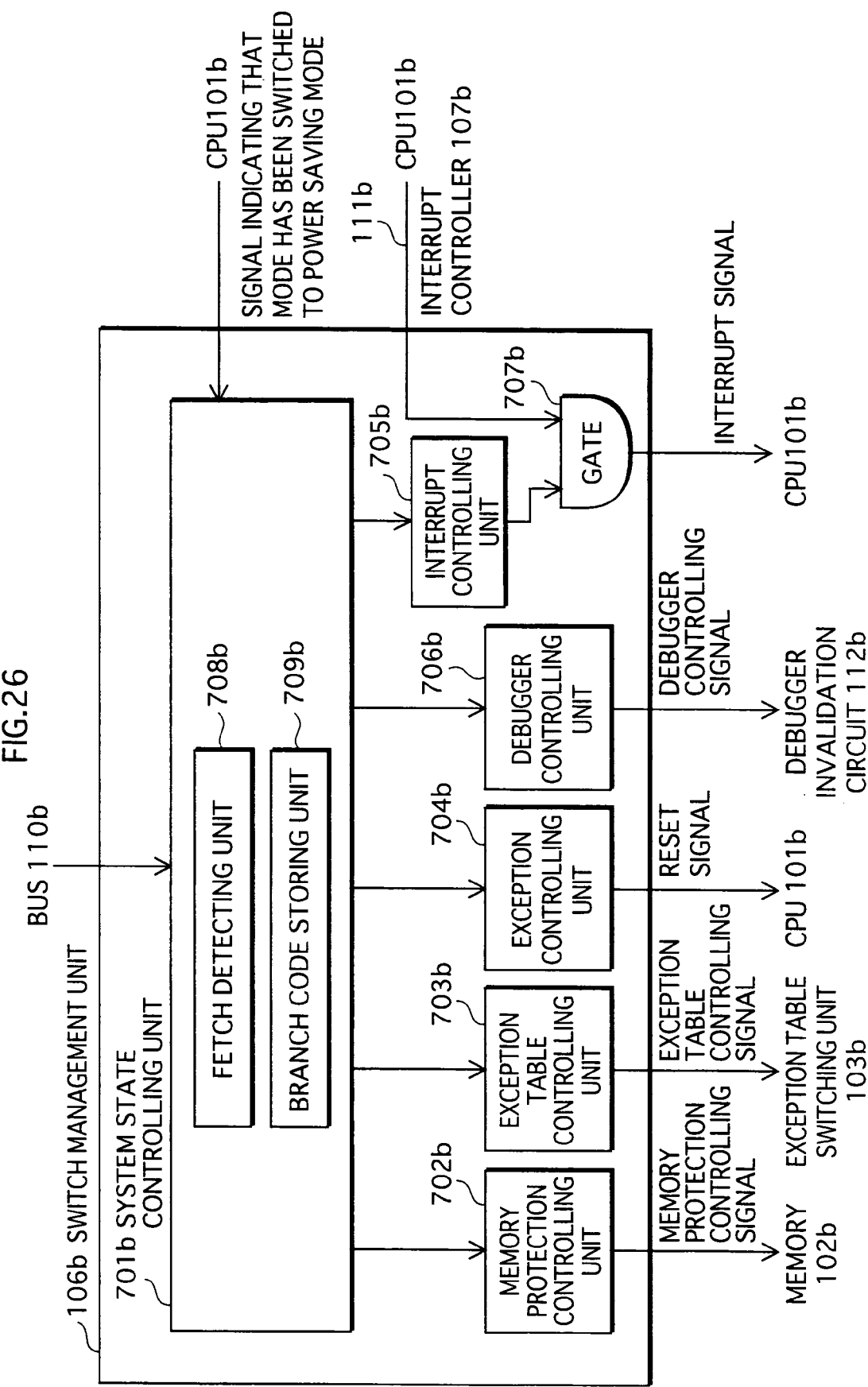
FIG. 26 shows the configuration of the switch management unit 106b.

FIG. 26 shows the configuration of the switch management unit 106b. As shown in the drawing, the switch management unit 106b comprises: a system state management unit 701b; a memory protection controlling unit 702b; an exception table controlling unit 703b; an exception controlling unit 704b; an interrupt controlling unit 705b; a debugger controlling unit 706b; and a gate 707b.

The system state management unit 701b outputs instructions to the memory protection controlling unit 702b, the exception table controlling unit 703b, the exception controlling unit 704b, the interrupt controlling unit 705b, and the debugger controlling unit 706b, depending on the information received via the bus 110b, the information received via signal lines, the state of the information processing apparatus 100b, and detection that a branch code is fetched by the fetch detecting unit 708b.

Since the operation of the system state management unit 701b is the same as the operation of the system state management unit 701a shown in FIG. 22, explanation will be omitted.

Figure 27:
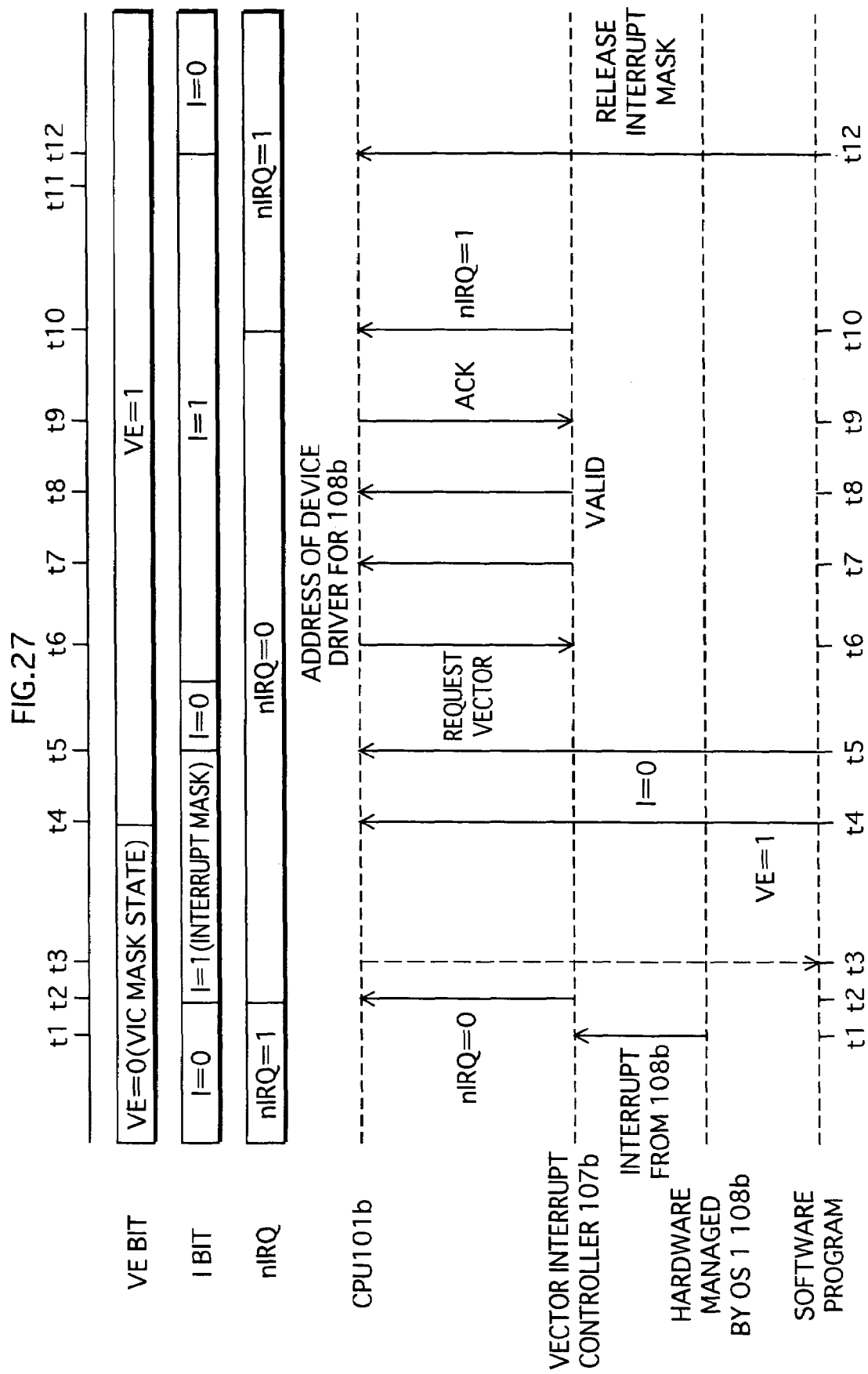
FIG. 27 is a sequence chart that illustrates the interrupt control in the information processing apparatus 100b.

FIG. 27 is a sequence chart that illustrates a specific example of the interrupt control in the information processing apparatus 100b.

Here, the VE bit is a vector interrupt controller invalidation bit that is set in the CPU 101b. VE=0 means that receiving a vector interrupt is prohibited, in other words, masking of a vector interrupt. VE=1 means that receiving a vector interrupt is allowed. The VE bit is set in the CPU 101b by software. The initial state of the VE bit after the CPU 101b is reset is VE=0.

The I bit is an IRQ interrupt invalidation bit stored in the current status register (csr) within the CPU 101b. I=1 means that receiving an interrupt is prohibited, in other words, masking an interrupt. I=0 means that receiving an interrupt is allowed.

Here, an nIRQ is a signal that informs the CPU 101b that an interrupt has occurred and is outputted from the gate 707b within the switch management unit 106b. When nIRQ=0 (LOW), it means that an interrupt has occurred.

In FIG. 27, time lapse is shown from the left to the right of the drawing (from t1 to t12). The following describes the interrupt control along the time line.

Prior to t1: On an assumption that the information processing apparatus 100b is operating on the OS 2, the OS 2 does not set VE as VE=1; therefore, VE=0 and vector interrupts from the vector interrupt controller 107b are masked. In addition, I is set so as to be I=0; therefore, receiving an interrupt is allowed.

t1: An interrupt has occurred from the hardware managed by the OS 1 108b, and the vector interrupt controller 107b is informed of the occurrence of the interrupt.

t2: Although it is omitted from FIG. 27, the vector interrupt controller 107b drives an interrupt signal 111b and informs the switch management unit 106b of the occurrence of the interrupt. When being informed of the occurrence of the interrupt, the switch management unit 106b asserts an nIRQ and informs the CPU 101b of the occurrence of the interrupt. When having received the nIRQ, the CPU 101b sets the I bit so that I=1, and masks an interrupt.

t3: As VE is set so as to be VE=0, the CPU 101b does not receive a vector address signal from the vector interrupt controller 107b and branches to the interrupt handler.

t4: The system state management unit 701b performs the operation shown in FIG. 29, and the OS 2 is switched to OS 1. Before releasing the interrupt mask in Step S1036 of FIG. 24 (RELEASE INTERRUPT MASK), the VE bit in the CPU 101b is set so that VE=1.

t5: When the I bit in the csr is set so that I=0 in Step S1036 of FIG. 24, since nIRQ=0, the CPU 101b accepts an interrupt again. Thereafter, the I bit is set so that I=1 again, and an interrupt is masked.

t6: Since VE=1, the CPU 101b requests the vector interrupt controller 107b to provide an address of a device driver, in order to process the interrupt.

t7: The vector interrupt controller 107b informs the CPU 101b of the address of the device driver of the hardware managed by the OS 1 108b.

t8: The vector interrupt controller 107b inquires of the CPU 101b whether the CPU 101b has received the address of the device driver or not.

t9: The CPU 101b transmits an ACK to the vector interrupt controller 107b so as to inform that the CPU 101b has received the address of the device driver.

t10: When having finished the process for the device driver, the CPU 101b instructs the vector interrupt controller 107b to clear the cause of the interrupt. The vector interrupt controller 107b withdraws the interrupt signal for the switch management unit 106b. The switch management unit 106b sets the nIRQ so that nIRQ=1.

t12: After the process is finished, the device driver sets the I bit of the csr in the CPU 101b so that I=0.

MODIFICATION EXAMPLE 2

The following describes information processing apparatus 100d as a modification example of the information processing apparatus 100a of the second embodiment.

Figure 28:
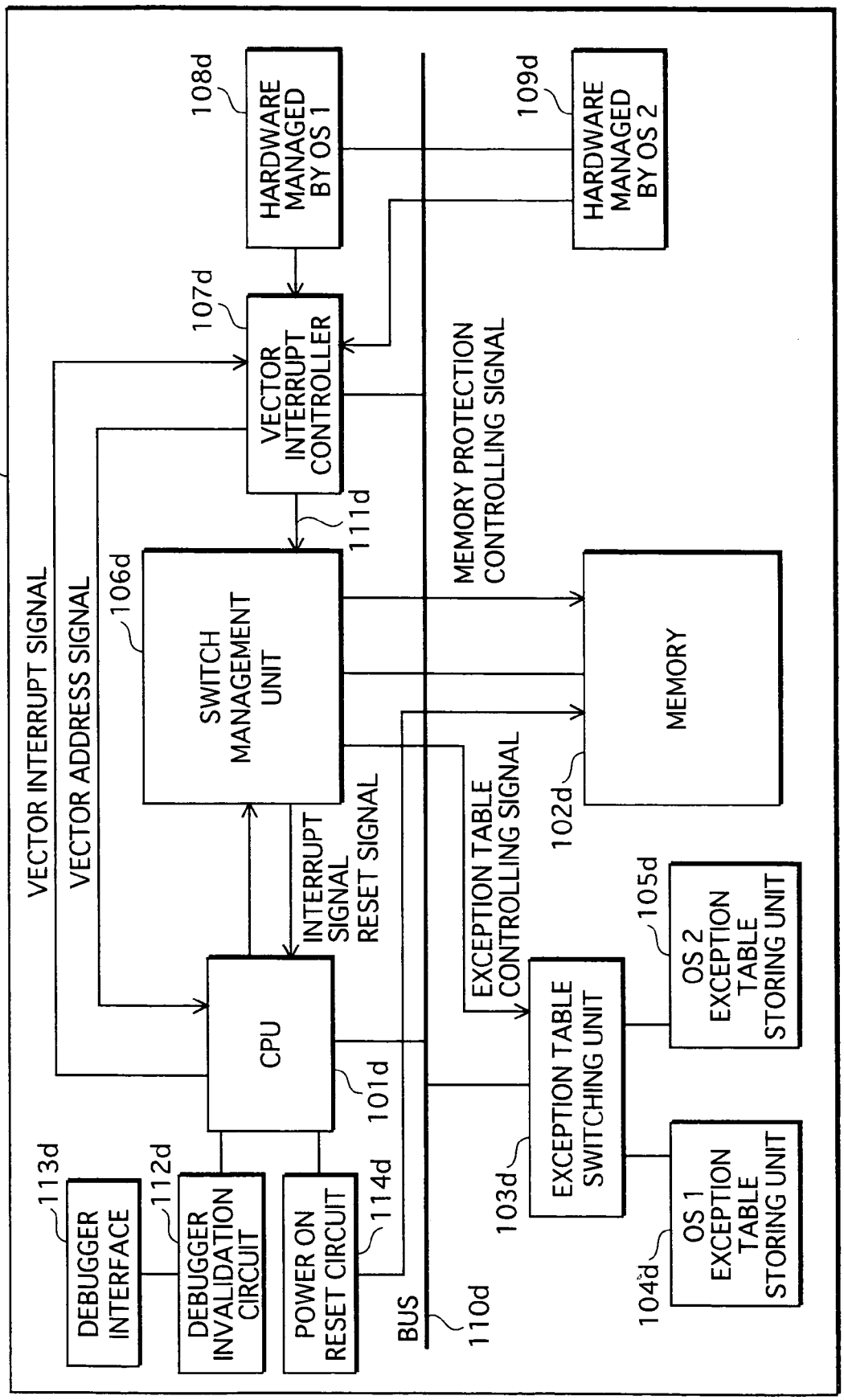
FIG. 28 is a functional block diagram that shows the configuration of the information processing apparatus 100d in terms of its functions.

FIG. 28 is a functional block diagram that shows the configuration of the information processing apparatus 100d in terms of its functions.

As shown in the drawing, the information processing apparatus 100d comprises: the CPU 101d, the memory 102d, the exception table switching unit 103d, the OS 1 exception table storing unit 104d, the OS 2 exception table storing unit 105d, the switch management unit 106d, the interrupt controller 107d, the hardware managed by the OS 1 108d, the hardware managed by the OS 2 109d; the bus 110d, the debugger invalidation circuit 112d, and the debugger interface 113d, and the power-on reset circuit 114d.

The information processing apparatus 100d differs from the information processing apparatus 100a in terms of the configuration in that it includes the power-on reset circuit 114d. Also, the memory 102d has a configuration that is partially different from the configuration of the memory 102a.

When electric power is supplied to the information processing apparatus 100d, and in the case where a system malfunction occurs due to a bug or noise, the power-on reset circuit 114d resets the information processing apparatus 100d as a whole.

In FIG. 28, the signal lines from the power-on reset circuit 114d are connected only with the CPU 101d and the memory 102d; however, in actuality, there are other constituent members to each of which a signal line from the power-on reset circuit 114d is connected. Those signal lines are omitted from the drawing.

When the CPU 101d has been reset due to a reset signal from the power-on reset circuit 114d, the CPU 101d clears the inside thereof and the OS 1 is booted. The process performed when the memory 102d is reset will be described later.

FIG. 30 is a functional block diagram that shows the configuration of the memory 102d in terms of its functions.

As shown in the drawing, the memory 102d includes a bus interface 501d, a memory protector 502d, a memory clear circuit 511d, and a memory area. The memory protector 502d includes: the switch 509d provided between the bus interface 501d and the OS 2 exception handler area 505d; and the switch 510d provided between the bus interface 501d and the OS 2 memory area 506d. The memory area is divided into the OS 1 exception handler area 503d, the OS 1 memory area 504d, the OS 2 exception handler area 505d, and the OS 2 memory area 506d. The memory 102d differs from the memory 102a in terms of the configuration in that it includes the memory clear circuit 511d.

Having received the reset instruction outputted from the power-on reset circuit 114d, the memory clear circuit 511d writes specified values into the OS 2 exception handler area 505d and the OS 2 memory area 506d. Here, each of the specified values may be zero or a random value. Further, the memory clear circuit 511d blocks an access from the memory protector 502d until values are written into the whole memory of each of the OS 2 exception handler area 505d and the OS 2 memory area 506d.

The reason is because the time required for the CPU 101d to be reset by the power-on reset circuit 114d and for the OS 1 to be booted is shorter than the time required for the memory clear circuit 511d to write the specified values into the OS 2 exception handler area 505d and the OS 2 memory area 506d, and therefore, there is a possibility that what is inside of the OS 2 exception handler area 505d and the OS 2 memory area 506d is analyzed and manipulated by the OS 1. Consequently, until the specified values are written into the OS 2 exception handler area 505d and the OS 2 memory area 506d, the memory clear circuit 511d needs to block an access from the memory protector 502d.

SUMMARY

The present invention has been explained according to the embodiments as above; however, the present invention is not limited to the embodiments above, needless to say. The following are also included in the present invention:

(1) In the embodiments above, the information processing apparatuses each include two operating systems such as the OS 1 and the OS 2; however, the number of operating systems in each information processing apparatus of the present invention is not limited to two, needless to say. The present invention includes an information processing apparatus that includes more than two operating systems.

(2) The present invention also includes combinations of any of the first embodiment, the second embodiment, the first modification example, and the second modification example.

(3) It is acceptable to consider that the present invention is methods as described above. Alternatively, it is acceptable to consider that the present invention is a computer program that realizes such methods with the use of a computer, or digital signals converted from the computer program.

Additionally, it is acceptable to consider that the present invention is a computer-readable recoding medium e.g. a flexible disk, a hard disk, a CD-ROM, an MO, a DVD, a DVD-ROM, a DVD-RAM, a BD (Blu-ray Disc), and a semiconductor memory, that records such a computer program or such digital signals thereon; or to consider that the present invention is such a computer program or such digital signals recorded on such a recording medium.

Further, it is acceptable to consider that the present invention is realized through transmission of such a computer program or such digital signals via telecommunication lines, wireless or cable transmission network, a network such as the Internet, or the like.

Moreover, it is acceptable to consider that the present invention is a computer system comprising a microprocessor and a memory, wherein the memory stores therein the computer program, and the microprocessor operates according to the computer program.

Furthermore, it is acceptable to execute the aforementioned program or digital signals on a dependent computer system by delivering the program or digital signals recorded on a recording medium or via the aforementioned network or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information processing apparatus that switches between a first operating system and a second operating system during operation, comprising:
   a storing unit including (i) a first area that stores therein data managed by the first operating system, (ii) a second area that stores therein a reset handler containing a return instruction for returning to the second operating system and a branch instruction for branching to the second operating system, and (iii) an access switching unit operable to switch between connection and disconnection to the first area from outside the storing unit;
   an exception table storing unit that stores therein a piece of positional information that shows a position at which the reset handler is located;
   a CPU that includes a program counter and is operable to execute an instruction located at a position indicated by positional information being set in the program counter; and
   a switch management unit operable to, when having received a switch instruction for switching from the first operating system to the second operating system while the information processing apparatus is operating with the first operating system in operation, instruct the access switching unit to make the first area disconnected and issue a reset instruction to the CPU to be reset, wherein
   when having received the reset instruction, the CPU initializes a state of the CPU and sets the piece of positional information of the reset handler into the program counter.

2. The information processing apparatus of claim 1, wherein
   the access switching unit is further operable to switch between connection and disconnection to the second area from outside the storing unit, and
   the switch management unit instructs, when having received the switch instruction, the access switching unit to make the second area connected, after making the first area disconnected.

3. The information processing apparatus of claim 2, wherein
   the storing unit further includes a third area that stores therein a first interrupt handler containing a save instruction for saving a state of the CPU while the first operating system is in operation before the switch to the second operating system,
   the access switching unit is further operable to switch between connection and disconnection to the third area from outside the storing unit,
   the exception table storing unit further stores therein a piece of positional information that shows a position at which the first interrupt handler is located,
   the CPU sets, when the first interrupt handler has been called by a program being executed while the first operating system is in operation, the piece of positional information of the first interrupt handler into the program counter, and
   the switch management unit receives the switch instruction for switching from the first operating system to the second operating system from the first interrupt handler.

4. The information processing apparatus of claim 3, wherein
   the switch management unit receives information indicating a program specified out of programs operating on the second operating system and what process the specified program is requested to perform, and
   the switch management unit informs the reset handler of the specified program and the process indicated in the information.

5. The information processing apparatus of claim 4, wherein
   the third area further stores therein a second interrupt handler containing (i) a judge instruction for judging whether a hardware interrupt that has occurred is an interrupt from hardware managed by the first operating system or an interrupt from hardware managed by the second operating system and (ii) a branch instruction for, when the hardware interrupt is judged to be an interrupt from the hardware managed by the first operating system, branching to the first interrupt handler,
   the exception table storing unit stores therein a piece of positional information that shows a position at which the second interrupt handler is located, and
   when having received an interrupt while the first operating system is in operation, the CPU sets the piece of positional information of the second interrupt handler into the program counter.

6. The information processing apparatus of claim 5, operating with the second operating system in operation after processes of the second interrupt handler and the first interrupt handler have been performed, wherein
   the reset handler includes an instruction for preparing for returning from the second operating system to the first operating system, and
   the CPU sets, as part of the preparation for returning to the first operating system, a starting address of a program for returning to the first operating system into a link register inside the CPU and branches to a device driver that operates the hardware managed by the second operating system, and when having detected that a process of the device driver has been completed, sets the starting address having been set in the link register into the program counter.

7. The information processing apparatus of claim 5, wherein
   the second interrupt handler further contains a branch instruction for branching to a device driver that operates the hardware managed by the first operating system, and
   when an interrupt has occurred, the CPU sets the piece of positional information of the second interrupt handler into the program counter, and when an interrupt has been judged to be an interrupt from the hardware managed by the first operating system, the CPU sets a piece of positional information of the device driver into the program counter.

8. The information processing apparatus of claim 3, wherein
the storing unit further includes a fourth area that stores therein data managed by the second operating system,
the access switching unit is further operable to switch connection and disconnection to the fourth area from outside the storing unit, and
when being instructed by the reset handler to make the fourth area connected, the switch management unit instructs the access switching unit to make the fourth area connected.

9. The information processing apparatus of claim 5, further including
an exception table switching unit operable to switch connection and disconnection to the exception table storing unit from outside the exception table storing unit, wherein
the exception table storing unit stores therein (i) a first exception table that includes pieces of positional information showing positions at which the first interrupt handler and the second interrupt handler are located and (ii) a second exception table that includes the piece of positional information showing the position at which the reset handler is located,
while the CPU is operating with the first operating system in operation, the switch management unit issues an instruction for having the first exception table connected and while the CPU is operating with the second operating system in operation, the switch management unit issues an instruction for having the second exception table connected, and
the exception table switching unit provides a connection from one of the first exception table and the second exception table to outside the exception table storing unit, depending on the instruction issued by the switch management unit.

10. The information processing apparatus of claim 3, wherein
the access switching unit is operable to switch between connection and disconnection to the third area from outside the storing unit, and
when having received, from the first interrupt handler, the switch instruction for switching from the first operating system to the second operating system, the switch management unit instructs the access switching unit to make the third area disconnected.

11. The information processing apparatus of claim 3, wherein
after having executed the save instruction, the first interrupt handler instructs the CPU to switch to a power saving mode,
the CPU performs a process of switching to the power saving mode and outputs, to the switch management unit, a signal indicating that the CPU is in the power saving mode, and
the switch management unit gives the reset instruction to the CPU to be reset, after having received the signal.

12. An information processing apparatus that switches between a first operating system and a second operating system during operation, comprising:
a storing unit including (i) a first area that stores therein data managed by the first operating system, (ii) a second area that stores therein a first interrupt handler containing a save instruction related to switching from the first operating system to the second operating system and an instruction that branches to another instruction for branching to the second operating system, (iii) a third area that stores therein a second handler containing a save instruction for saving the second operating system and a return instruction for returning to the second operating system, and (iv) an access switching unit operable to switch connection and disconnection to the first area and the second area from outside the storing unit; and
a switch management unit that includes a branch instruction storing unit storing therein a branch instruction for branching to the first interrupt handler and a fetch detecting unit operable to detect that the branch instruction has been fetched, wherein
when the fetch detecting unit has detected that the branch instruction has been fetched, the switching management unit instructs the access switching unit to make the first area disconnected.

13. The information processing apparatus of claim 12, further comprising
a CPU that includes a program counter and is operable to execute an instruction located at a position indicated by positional information being set in the program counter, wherein
the CPU sets, before processing the second interrupt handler and issues an instruction for switching from the second operating system to the first operating system, a return address for returning from the first operating system to the second operating system, into the branch instruction storing unit.

14. The information processing apparatus of claim 13, wherein
the first interrupt handler masks an interrupt and informs the switch management unit of a program specified out of programs operating on the second operating system and what process the specified program is requested to perform,
the CPU reads a piece of positional information that shows a position at which the return instruction called by the first interrupt handler is located, from the branch instruction storing unit and sets the piece of positional information of the return instruction into the program counter, and
the switching management unit informs the second interrupt handler of the specified program and the process.

15. The information processing apparatus of claim 14, wherein
the second interrupt handler checks for a cause of the switch from the first operating system to the second operating system, and when the cause of the switch is a process request to a program operating on the second operating system, the second interrupt handler branches to the specified program, and
the CPU sets a piece of positional information that shows a position at which the specified program called by the second interrupt handler is located, into the program counter.

16. The information processing apparatus of claim 14, wherein
the second interrupt handler checks for a cause of the switch from the first operating system to the second operating system, and when the cause of the switch is an interrupt from hardware managed by the second operating system, the second interrupt handler releases the interrupt mask and sets a piece of positional information that shows a position at which a device driver operating the hardware managed by the second operating system is located, into the program counter, and when having detected that a process performed by the device driver is completed, the CPU sets the piece of positional information of the return instruction into the program counter.

17. The information processing apparatus of claim 12, further comprising a debugger invalidation circuit operable to connect and disconnect the CPU to and from an external debugger, in response to an instruction from the switch management unit, wherein while the CPU is operating with the first operating system in operation, the switch management unit instructs the debugger invalidation circuit to disconnect the CPU from the external debugger, and while the CPU is operating with the second operating system in operation, the switch management unit instructs the debugger invalidation circuit to connect the CPU to the external debugger.

18. The information processing apparatus of claim 17, further comprising a vector interrupt controller that includes (i) a first signal line via which an interrupt from hardware managed by the first operating system is received, (ii) a second signal line via which an interrupt from hardware managed by the second operating system is received, and (iii) a table showing pieces of positional information of a device driver operating the hardware managed by the first operating system and of a device driver operating the hardware managed by the second operating system, wherein the second area further stores therein a boot code for booting the first operating system, while the boot code is being executed, the CPU invalidates obtainment of the pieces of positional information of the device drivers from the vector interrupt controller, and while the second interrupt handler is being executed, the CPU validates obtainment of the pieces of positional information of the device drivers from the vector interrupt controller.

19. The information processing apparatus of claim 17, further comprising a power-on reset circuit, wherein the storing unit further includes a stored-data deleting unit, the power-on reset circuit outputs a reset signal for initializing the CPU and the storing unit to the CPU and the stored-data deleting unit, the CPU initializes a state of the CPU, when having received the reset signal from the power-on reset circuit, and the stored-information deleting unit deletes data stored in the storing unit, when having received the reset signal from the power-on reset circuit, and makes the storing unit disconnect from outside the storing unit during a time period between the reception of the reset signal and completion of the deletion of the stored data.

* * * * *